US011375452B2

(12) United States Patent
Nam et al.

(10) Patent No.: US 11,375,452 B2
(45) Date of Patent: Jun. 28, 2022

(54) WAKEUP GROUPING FOR DISCONTINUOUS RECEPTION OPERATION

(71) Applicant: QUALCOMM Incorporated, San Diego, CA (US)

(72) Inventors: Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/790,575

(22) Filed: Feb. 13, 2020

(65) Prior Publication Data

US 2020/0267646 A1    Aug. 20, 2020

Related U.S. Application Data

(60) Provisional application No. 62/806,695, filed on Feb. 15, 2019.

(51) Int. Cl.
*G08C 17/00* (2006.01)
*H04W 52/02* (2009.01)
(Continued)

(52) U.S. Cl.
CPC ... *H04W 52/0219* (2013.01); *H04W 52/0216* (2013.01); *H04W 72/14* (2013.01); *H04W 76/28* (2018.02)

(58) Field of Classification Search
CPC .. Y02D 70/1262; Y02D 70/00; Y02D 70/142; Y02D 70/1242; Y02D 70/144;
(Continued)

(56) References Cited

U.S. PATENT DOCUMENTS

2003/0223388 A1* 12/2003 Agashe ............... H04W 72/042
370/329
2004/0029622 A1* 2/2004 Laroia ............... H04W 52/0235
455/574
(Continued)

FOREIGN PATENT DOCUMENTS

WO    WO-2018175760 A1    9/2018

OTHER PUBLICATIONS

International Search Report and Written Opinion—PCT/US2020/018232—ISA/EPO—dated Jun. 5, 2020.
(Continued)

*Primary Examiner* — Atique Ahmed
(74) *Attorney, Agent, or Firm* — Holland & Hart LLP

(57) ABSTRACT

Methods, systems, and devices for wireless communications are described. Some wireless communications systems (e.g., millimeter wave (mmW) systems) may support user equipment (UEs) operating in a discontinuous reception (DRX) mode. A UE, in these wireless communications systems, may receive signaling configuring the UE with a set of wakeup grouping sets. Each of the set of wakeup grouping sets may identify a set of groups of one or more UEs. The UE may subsequently receive a wakeup signal during a monitoring occasion for wakeup signals, and determine that the received wakeup signal indicates a group in a wakeup grouping set of the set of wakeup grouping sets that includes the UE. In response, the UE may initiate a wakeup procedure.

29 Claims, 18 Drawing Sheets

(51) Int. Cl.
*H04W 76/28* (2018.01)
*H04W 72/14* (2009.01)

(58) Field of Classification Search
CPC ............ Y02D 30/70; H04W 52/0219; H04W 52/0216; H04W 72/14; H04W 76/28; H04W 52/0235; H04W 52/0229; H04L 5/0053
See application file for complete search history.

(56) References Cited

U.S. PATENT DOCUMENTS

| | | | | |
|---|---|---|---|---|
| 2005/0047429 | A1* | 3/2005 | Koo | H04W 52/0216 370/335 |
| 2007/0270118 | A1* | 11/2007 | Subramanian | H04W 52/0216 455/343.2 |
| 2009/0135755 | A1* | 5/2009 | Qi | H04W 52/0216 370/311 |
| 2012/0275365 | A1* | 11/2012 | Anderson | H04W 52/0222 370/311 |
| 2013/0115977 | A1* | 5/2013 | Chandramouli | H04W 68/02 455/458 |
| 2013/0229959 | A1* | 9/2013 | Ghosh | H04W 74/08 370/311 |
| 2014/0335867 | A1* | 11/2014 | Hsu | H04W 68/02 455/574 |
| 2017/0215169 | A1* | 7/2017 | Lee | H04W 52/0216 |
| 2017/0303235 | A1* | 10/2017 | Deogun | H04W 68/005 |
| 2018/0027495 | A1* | 1/2018 | Song | G06F 1/3206 455/343.2 |
| 2018/0288706 | A1* | 10/2018 | Fang | H04L 27/2603 |
| 2019/0090293 | A1* | 3/2019 | Su | H04W 8/005 |
| 2020/0029302 | A1* | 1/2020 | Cox | H04W 52/0235 |

OTHER PUBLICATIONS

LG Electronics: "Wake up signal design in NB-IoT", 3GPP Draft, 3GPP TSG RAN WG1 Meeting #92bis, R1-1804521, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018 (Apr. 15, 2018), XP051426791, 11 pages, Retrieved from the Internet: URL: http://www.3gpp.org/ftp/Meetings%5F3GPP%5FSYNC/RAN1/Docs/. [retrieved on Apr. 15, 2018] Sections 2 and 3.

* cited by examiner

WAKEUP GROUPING FOR DISCONTINUOUS RECEPTION OPERATION

CROSS REFERENCE

The present Applications for Patent claims the benefit of U.S. Provisional Patent Application No. 62/806,695 by Nam et al., entitled "WAKEUP GROUPING FOR DISCONTINUOUS RECEPTION OPERATION," filed Feb. 15, 2019, assigned to the assignee hereof, and expressly incorporated by reference in its entirety herein.

BACKGROUND

The following relates generally to wireless communications, and more specifically to wakeup grouping for discontinuous reception (DRX) operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless multiple access communications system may include a number of base stations or network access nodes, each simultaneously supporting communication for multiple communication devices, which may be otherwise known as a user equipment (UE). Some wireless communications systems may support UEs operating in a DRX mode. UEs in a DRX mode may transition between a sleep state for power conservation and an active state for data transmission and reception (during an on duration) according to a wakeup signal. Conventional techniques for processing wakeup signals in a DRX mode are deficient.

SUMMARY

In a wireless communications system where there is a traffic imbalance among user equipments (UEs), using standing UE-specific and group-specific wakeup signal configurations, some or all UEs may experience a power penalty due to the UEs waking up unnecessarily. The described techniques relate to improved methods, systems, devices, and apparatuses that support wakeup grouping for discontinuous reception (DRX) operation. Generally, the described techniques address the shortcomings of standing UE-specific and group-specific wakeup signal configurations by configuring the UEs with a set of wakeup grouping sets. Each wakeup grouping set may identify a set of groups of one or more UEs, and for each wakeup grouping set, the UEs may be a member of at least one group of each of the wakeup grouping sets. Configuring different wakeup grouping sets may allow a scheduling base station to more efficiently and flexibly schedule and group UEs to reduce unnecessary wakeups of UEs for which no transmissions are scheduled. In some examples, the set of wakeup grouping sets may follow a hopping pattern to further reduce occurrences of false wakeups for UEs. By configuring different wakeup grouping sets, the power penalty of false wakeups may be reduced by sharing the power penalty across the UEs. In this way, the use of wakeup grouping sets described herein may efficiently use resources to support wakeup procedures for multiple UEs with minimal power penalties to the UEs.

A method of wireless communication at a UE is described. The method may include receiving signaling configuring the UE with a set of wakeup grouping sets, each of the set of wakeup grouping sets identifying a set of groups of one or more UEs, receiving a wakeup signal during a monitoring occasion for wakeup signals, determining that the received wakeup signal indicates a group in a wakeup grouping set of the wakeup grouping sets, where the group includes the UE, and initiating a wakeup procedure for the UE based on the determining.

An apparatus for wireless communication is described. The apparatus may include a processor, memory in electronic communication with the processor, and instructions stored in the memory. The instructions may be executable by the processor to cause the apparatus to receive signaling configuring the apparatus with a set of wakeup grouping sets, each of the set of wakeup grouping sets identifying a set of groups of one or more apparatuses, receive a wakeup signal during a monitoring occasion for wakeup signals, determine that the received wakeup signal indicates a group in a wakeup grouping set of the wakeup grouping sets, where the group includes the apparatus, and initiate a wakeup procedure for the apparatus based on the determining.

Another apparatus for wireless communication is described. The apparatus may include means for receiving signaling configuring the apparatus with a set of wakeup grouping sets, each of the set of wakeup grouping sets identifying a set of groups of one or more apparatuses, receiving a wakeup signal during a monitoring occasion for wakeup signals, determining that the received wakeup signal indicates a group of a wakeup grouping set of the set of wakeup grouping sets that includes the apparatus, and initiating a wakeup procedure for the apparatus based on the determining.

A non-transitory computer-readable medium storing code for wireless communication at a UE is described. The code may include instructions executable by a processor to receive signaling configuring the UE with a set of wakeup grouping sets, each of the set of wakeup grouping sets identifying a set of groups of one or more UEs, receive a wakeup signal during a monitoring occasion for wakeup signals, determine that the received wakeup signal indicates a group in a wakeup grouping set of the wakeup grouping sets, where the group includes the UE, and initiate a wakeup procedure for the UE based on the determining.

Some examples of the method, apparatuses, and non-transitory computer-readable medium described herein may further include operations, features, means, or instructions for identifying a hopping pattern for the set of wakeup grouping sets, and determining the wakeup grouping set for the monitoring occasion according to the identified hopping pattern.

Some examples of the method, apparatuses, and non-transitory computer-readable medium described herein may further include operations, features, means, or instructions for identifying an index associated with the monitoring occasion, the index including a system frame number, or a DRX cycle index, or a frequency resource index, or a carrier index, or a combination thereof, and determining the wakeup grouping set for the monitoring occasion according to the identified hopping pattern and the index associated with the monitoring occasion.

Some examples of the method, apparatuses, and non-transitory computer-readable medium described herein may further include operations, features, means, or instructions for attempting to decode the received wakeup signal according to a set of decoding hypotheses that correspond to the set of wakeup grouping sets, determining a successful decoding hypothesis of the set of decoding hypotheses, and identifying the wakeup grouping set as corresponding to the successful decoding hypothesis.

In some examples of the method, apparatuses, and non-transitory computer-readable medium described herein, receiving the signaling configuring the UE with the set of wakeup grouping sets may include operations, features, means, or instructions for receiving radio resource control signaling from a base station indicating the set of wakeup grouping sets.

In some examples of the method, apparatuses, and non-transitory computer-readable medium described herein, each group of the set of groups may be associated with a different resource than each other group of the set of groups.

In some examples of the method, apparatuses, and non-transitory computer-readable medium described herein, the resource includes a frequency resource, or a time resource, or a control channel signaling type, or a reference signal type, or a data payload, or a radio network temporary identifier, or a combination thereof.

In some examples of the method, apparatuses, and non-transitory computer-readable medium described herein, for each wakeup grouping set of the set of wakeup grouping sets, the one or more UEs may be members of at least one group of the set of groups.

In some examples of the method, apparatuses, and non-transitory computer-readable medium described herein, the received wakeup signal includes one or more reference signals, or control channel signaling, or one or more predetermined sequences, or a combination thereof.

In some examples of the method, apparatuses, and non-transitory computer-readable medium described herein, the one or more reference signals include a channel state information reference signal, or a tracking reference signal, or a demodulation reference signal, or a synchronization signal, or a combination thereof.

In some examples of the method, apparatuses, and non-transitory computer-readable medium described herein, the one or more predetermined sequences include a pseudo-noise code sequence, or a Gold sequence, or a Zadoff-Chu sequence, or a combination thereof.

Some examples of the method, apparatuses, and non-transitory computer-readable medium described herein may further include operations, features, means, or instructions for monitoring a control channel subsequent to initiating the wakeup procedure.

Some examples of the method, apparatuses, and non-transitory computer-readable medium described herein may further include operations, features, means, or instructions for receiving, within the control channel, a grant from a base station serving the UE, and communicating with the base station based on the grant.

In some examples of the method, apparatuses, and non-transitory computer-readable medium described herein, the resources of the monitored control channel may be different than resources of the monitoring occasion for wakeup signals.

In some examples of the method, apparatuses, and non-transitory computer-readable medium described herein, the monitoring occasion includes a pre-wakeup window of a connected mode DRX cycle.

A method of wireless communication at a base station is described. The method may include transmitting, to a UE, signaling configuring the UE with a set of wakeup grouping sets, each of the set of wakeup grouping sets identifying a set of groups of one or more UEs, determining, for a monitoring occasion, a wakeup grouping set of the set of wakeup grouping sets, the determined wakeup grouping set including a group that includes the UE, and transmitting, during the monitoring occasion, a wakeup signal for the group according to the determined wakeup grouping set.

An apparatus for wireless communication is described. The apparatus may include a processor, memory in electronic communication with the processor, and instructions stored in the memory. The instructions may be executable by the processor to cause the apparatus to transmit, to a UE, signaling configuring the UE with a set of wakeup grouping sets, each of the set of wakeup grouping sets identifying a set of groups of one or more UEs, determine, for a monitoring occasion, a wakeup grouping set of the set of wakeup grouping sets, the determined wakeup grouping set including a group that includes the UE, and transmit, during the monitoring occasion, a wakeup signal for the group according to the determined wakeup grouping set.

Another apparatus for wireless communication is described. The apparatus may include means for transmitting, to a UE, signaling configuring the UE with a set of wakeup grouping sets, each of the set of wakeup grouping sets identifying a set of groups of one or more UEs, determining, for a monitoring occasion, a wakeup grouping set of the set of wakeup grouping sets, the determined wakeup grouping set including a group that includes the UE, and transmitting, during the monitoring occasion, a wakeup signal for the group according to the determined wakeup grouping set.

A non-transitory computer-readable medium storing code for wireless communication at a base station is described. The code may include instructions executable by a processor to transmit, to a UE, signaling configuring the UE with a set of wakeup grouping sets, each of the set of wakeup grouping sets identifying a set of groups of one or more UEs, determine, for a monitoring occasion, a wakeup grouping set of the set of wakeup grouping sets, the determined wakeup grouping set including a group that includes the UE, and transmit, during the monitoring occasion, a wakeup signal for the group according to the determined wakeup grouping set.

Some examples of the method, apparatuses, and non-transitory computer-readable medium described herein may further include operations, features, means, or instructions for identifying a hopping pattern for the set of wakeup grouping sets, and determining the wakeup grouping set for the monitoring occasion according to the identified hopping pattern.

Some examples of the method, apparatuses, and non-transitory computer-readable medium described herein may further include operations, features, means, or instructions for identifying an index associated with the monitoring occasion, the index including a system frame number, or a DRX cycle index, or a frequency resource index, or a carrier index, or a combination thereof, and determining the wakeup grouping set for the monitoring occasion according to the identified hopping pattern and the index associated with the monitoring occasion.

In some examples of the method, apparatuses, and non-transitory computer-readable medium described herein, transmitting the signaling configuring the UE with the set of wakeup grouping sets may include operations, features, means, or instructions for transmitting radio resource control signaling indicating the set of wakeup grouping sets.

Some examples of the method, apparatuses, and non-transitory computer-readable medium described herein may further include operations, features, means, or instructions for identifying a second group of the wakeup grouping set for one or more additional UEs, and where transmitting the wakeup signal for the group that includes the UE includes: transmitting, during the monitoring occasion, the wakeup signal for the group that includes the UE using a first set of resources and for the second group for the one or more additional UEs on a second set of resources.

In some examples of the method, apparatuses, and non-transitory computer-readable medium described herein, each group of the set of groups may be associated with a different resource than each other group of the set of groups.

In some examples of the method, apparatuses, and non-transitory computer-readable medium described herein, the resource includes a frequency resource, or a time resource, or a control channel signaling type, or a reference signal type, or a data payload, or a radio network temporary identifier, or a combination thereof.

In some examples of the method, apparatuses, and non-transitory computer-readable medium described herein, for each wakeup grouping set of the set of wakeup grouping sets, the one or more UEs may be members of at least one group of the set of groups.

In some examples of the method, apparatuses, and non-transitory computer-readable medium described herein, the transmitted wakeup signal includes one or more reference signals, or control channel signaling, or one or more predetermined sequences, or a combination thereof.

In some examples of the method, apparatuses, and non-transitory computer-readable medium described herein, the one or more reference signals include a channel state information reference signal, or a tracking reference signal, or a demodulation reference signal, or a synchronization signal, or a combination thereof.

In some examples of the method, apparatuses, and non-transitory computer-readable medium described herein, the one or more predetermined sequences include a pseudo-noise code sequence, or a Gold sequence, or a Zadoff-Chu sequence, or a combination thereof.

Some examples of the method, apparatuses, and non-transitory computer-readable medium described herein may further include operations, features, means, or instructions for transmitting, to the UE, a grant within a control channel subsequent to the monitoring occasion, and communicating with the UE based on the grant.

In some examples of the method, apparatuses, and non-transitory computer-readable medium described herein, the resources of the control channel may be different than resources of the monitoring occasion for wakeup signals.

In some examples of the method, apparatuses, and non-transitory computer-readable medium described herein, the monitoring occasion includes a pre-wakeup window of a connected mode DRX cycle.

DETAILED DESCRIPTION

Figure 1:
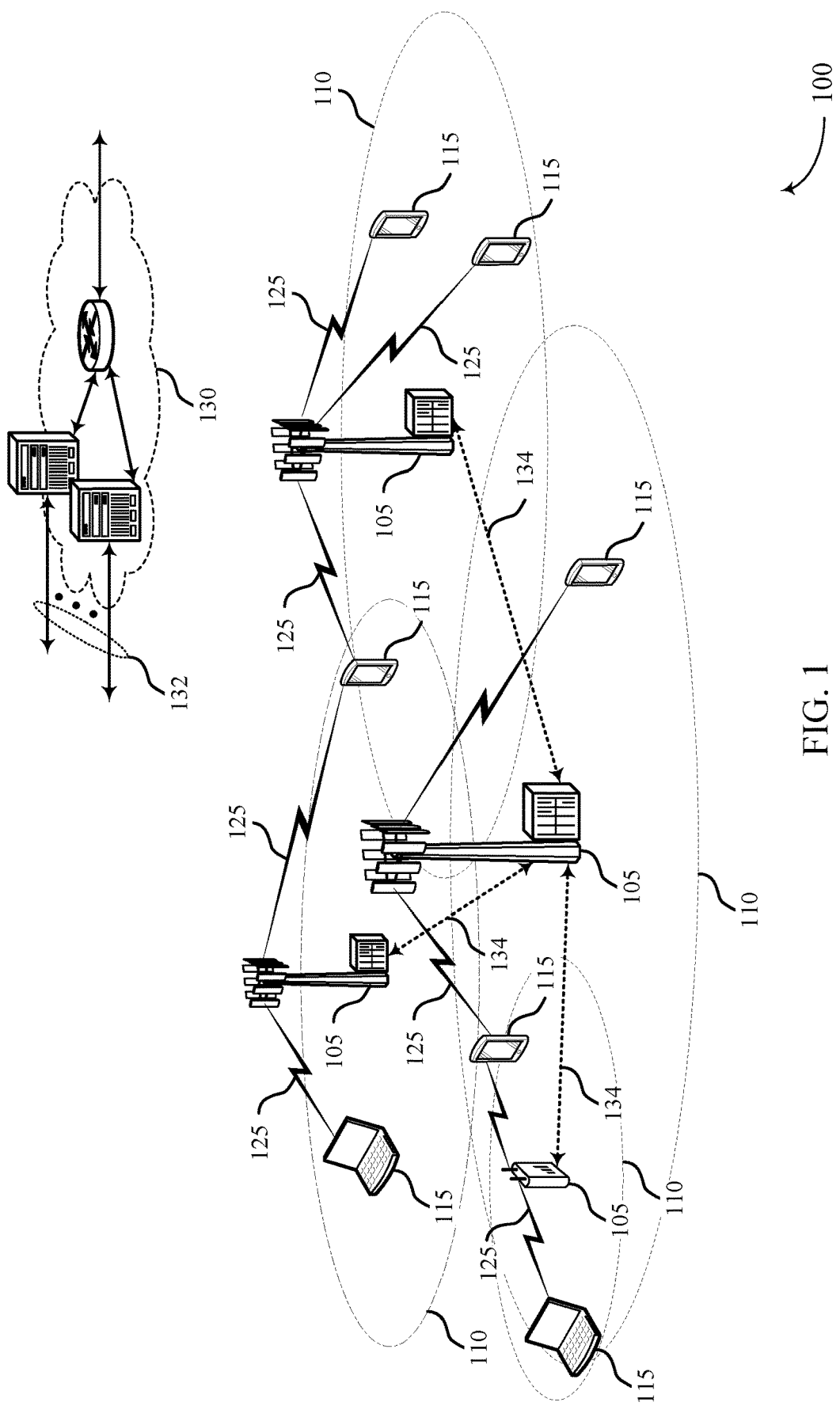
FIGS. 1 and 2 illustrate examples of wireless communications systems that support wakeup grouping for discontinuous reception (DRX) operation in accordance with aspects of the present disclosure.

Some wireless communications systems (e.g., millimeter wave (mmW) systems) may support user equipment (UEs) operating in a discontinuous reception (DRX) mode (e.g., a connected DRX (C-DRX) mode). A base station (e.g., eNodeB (eNB), a next-generation NodeB or giga-NodeB (either of which may be referred to as a gNB)) may serve a large number of UEs within a cell. To efficiently use wakeup signals, the base station may differentiate the wakeup signals intended for group of UEs based in part on a wakeup signal configuration, which may include a set of wakeup grouping sets. Each wakeup grouping set may include at least one group of one or more UEs, and each UE may be a member of at least one group within a wakeup grouping set. By way of example, when in a DRX mode, a group of UEs may monitor for wakeup signals according to the wakeup signal configuration. If the UEs receive a wakeup signal that indicates a group to which the UEs are a member, the UEs may determine that the wakeup signal is intended for the UEs. According to this determination, the UEs may initiate a wakeup procedure and transition to an active mode for data transmission and reception. However, if the UEs detect a wakeup signal that does not correspond to a group to which the UEs are a member, the UEs may determine that the wakeup signal is not intended for the UEs (e.g., intended for a different UE) and may not wake up. In this way, a set of wakeup grouping sets may reduce the number of false wakeups performed by the UEs and improving the power savings at the UEs.

Further, the techniques described herein may reduce or eliminate latencies associated with processes related to wakeup signaling for a DRX operation, and more specifically enable the base station to configure the UEs with wakeup grouping for the DRX operation to improve power savings of the UEs. As a result, the UEs may experience reduced occurrences of false wakeups, or no false wakeups.

For example, in a traffic imbalance scenario, some UEs may have relatively high downlink traffic, while other UEs may have relatively low traffic. For example, one UE may have downlink traffic, while other UEs may have no data traffic. In such example, if a single wakeup grouping set is configured, the others UEs may continuously wake up unnecessarily, thereby incurring a power penalty (e.g., using power to wake up from a sleep state). By configuring different wakeup grouping sets and corresponding different wakeup signal resources (e.g., according to a hopping pattern), the power penalty of false wakeups may be reduced by sharing the power penalty across all the UEs.

Aspects of the disclosure are initially described in the context of wireless communications systems. Additional aspects of the disclosure are described with respect to a wakeup procedure timeline and a process flow. Aspects of the disclosure are further illustrated by and described with reference to apparatus diagrams, system diagrams, and flowcharts that relate to wakeup grouping for DRX operation.

FIG. 1 illustrates an example of a wireless communications system 100 that supports wakeup grouping for DRX operation in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNB, a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas.

Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the received signal with a highest quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some wireless communications systems 100 (e.g., mmW systems) may support UEs 115 operating in a DRX mode (or a C-DRX mode). In a DRX mode, a UE 115 may switch between an active state for data transmission and reception and a sleep state for power saving. The UE 115 may determine if data is available by monitoring a control channel, such as a physical downlink control channel (PDCCH). The PDCCH may carry or otherwise convey an indication that a base station 105 has data prepared to transmit to the UE 115 or is scheduling the UE 115 for data transmission. In some examples, base stations 105 may use a wakeup signal to convey an indication that the base stations 105 have data ready to transmit to the UEs 115 or are scheduling the UEs 115 for data transmission. Examples of a wakeup signal may be a reference signal-type signals, such as a channel state information (CSI) reference signal (CSI-RS), or a tracking reference signal (TRS), or a demodulation reference signal (DMRS), a synchronization signal, or the like. In other examples, examples of wakeup signals may be PDDCH-type signals. In some examples, a wakeup signal may be scrambled according to a scrambling sequence, such as a pseudo-noise (PN) sequence, a Zadoff-Chu (ZC) sequence, or a Gold sequence, etc.

To reduce the frequency of control channel monitoring and improve power efficiency at the UE 115 during DRX operation, the UE 115 may monitor for a wakeup signal while in a low power mode. For example, if the UE 115 receive (or detects) a wakeup signal transmitted by the base station 105, the UE 115 may transition to a higher power mode to monitor the control channel for scheduling information. However, if the UE 115 does not receive (or detect) a wakeup signal transmitted by the base station 105, the UE 115 may skip a control channel monitoring opportunity and instead return to a deep sleep mode. Thus, the UE 115 may reduce occasions of having to unnecessarily wakeup (e.g., when no data transmissions are scheduled during a duration (e.g., an ON duration) associated with an active state), improving the power savings at the UE 115.

A base station 105 may serve a large number of UEs 115 within a cell (e.g., geographic coverage area). To resourcefully use wakeup signals, the base station 105 may differentiate the wakeup signals intended for each UE 115 or group of UEs 115 based in part on a wakeup signal configuration. In some examples, the wakeup signal configuration may be specific to each UE 115. That is, each UE 115 may have a dedicated wakeup signal, a wakeup signal monitoring occasion, or both. In other examples, the wakeup signal configuration may include a group of UEs 115 that share the same wakeup signal, wakeup signal monitoring occasion, or both. In some examples, the wakeup signal configuration may provide resource efficiency for base stations 105, and therefore benefit base stations 105 with reduced overhead signaling. Additionally, the wakeup signal configuration may provide power efficiencies to UEs 115, and therefore benefit UEs 115 with improved power savings.

The wakeup signal configuration may include a number of wakeup grouping sets and a number of wakeup signal resources for wakeup signaling monitoring occasions. In some examples, UEs 115 may be configured with multiple wakeup grouping sets. Each wakeup grouping set may include one or more UEs 115, and each UE 115 may be a member of at least one group of the wakeup grouping set. In some examples, UEs 115 that belong to a same group may be awakened simultaneously by a wakeup signal. For UEs 115 that belong to different groups, the base stations 105 may transmit one or more wakeup signals to the different groups concurrently and distinguish between the wakeup signals of the different groups of the wakeup grouping sets based in part on a resource allocation (e.g., mapping of frequency and time resources, sequences), a waveform (e.g., control channel type, reference signal type, and the like), or a message (e.g., data payload embedded in a wakeup signal, a radio network temporary identifier (RNTI) associated with a waveform (e.g., for a PDCCH-type wakeup signal)), and the like. Therefore, at a given time, the base stations 105 may select a group from the wakeup grouping sets and transmit one or more wakeup signals to the UEs 115 belonging to the selected group.

Base stations 105 may transmit configuration signaling to configure UEs 115 with the number of wakeup grouping sets and the number of wakeup signal resources for wakeup signaling monitoring occasions, such that the UEs 115 may operate appropriately in a DRX mode. For example, a base station 105 may transmit a wakeup signal configuration to a UE 115 via higher-layer signaling (e.g., RRC signaling) to configure the UE 115 with the number of wakeup grouping sets and the number of wakeup signal resources for wakeup signaling monitoring occasions. Each UE 115 may be configured with a configuration that indicates how the UE 115 monitors for wakeup signals, decodes wakeup signals, and the like. For example, if UEs 115 detect a wakeup signal transmitted in a wakeup grouping set for a group that includes the UEs 115 and on a wakeup signal resource configured for the UEs 115, the UEs 115 may initiate a wakeup procedure according to the wakeup signal. Otherwise, UEs 115 may refrain from performing the wakeup procedure. Accordingly, by differentiating wakeup signals for different UEs 115 using these wakeup grouping sets, the wireless communications system 100 may support improved power savings at the UEs 115, as well as reduced false wakeups.

Figure 2:
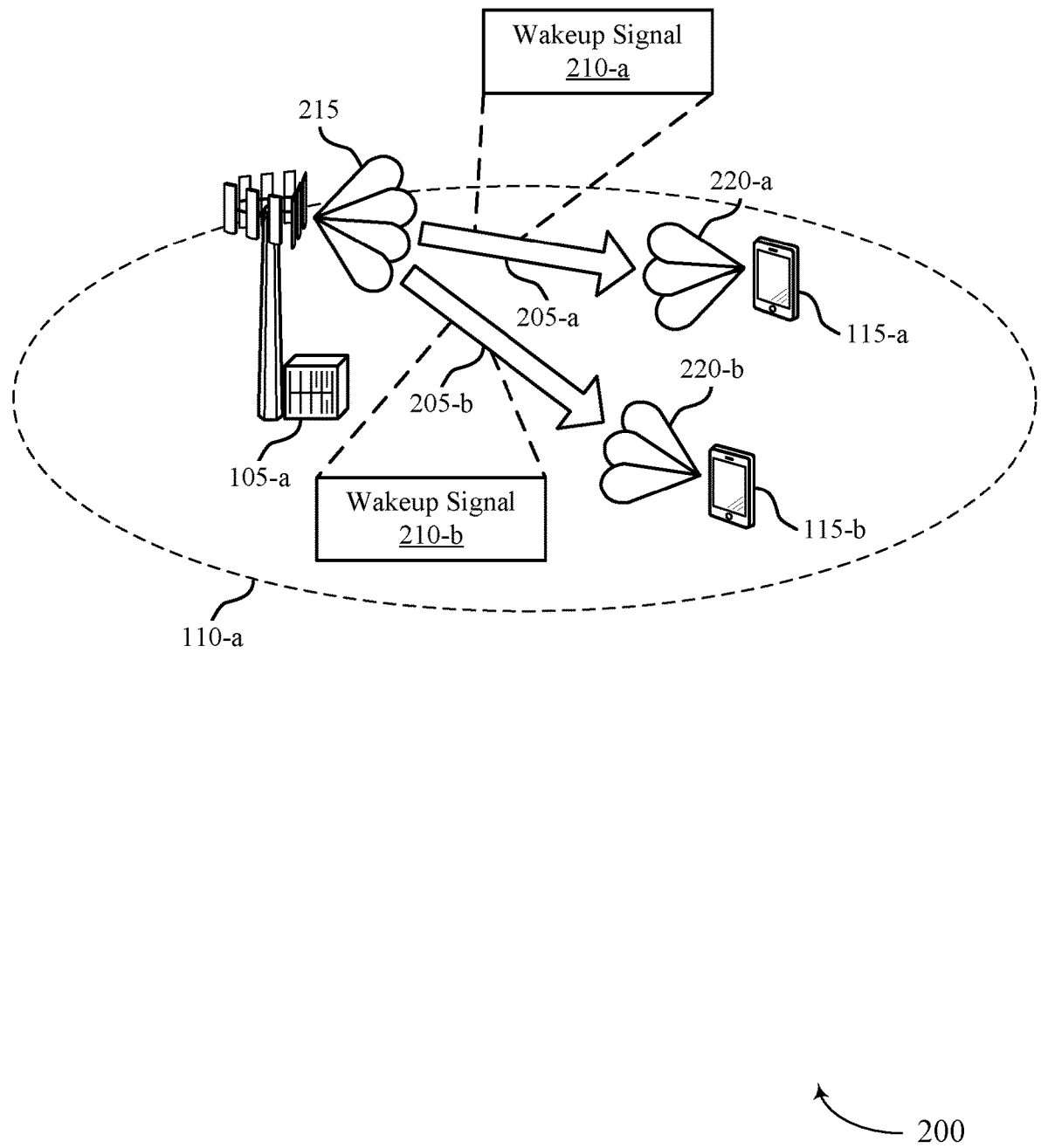

FIG. 2 illustrates an example of a wireless communications system 200 that supports wakeup grouping for DRX operation in accordance with aspects of the present disclosure. In some examples, the wireless communications system 200 may implement aspects of the wireless communications system 100. For example, the wireless communications system 200 may include a base station 105-a, a UE 115-a, and a UE 115-b, which may be examples of the corresponding devices described with reference to FIG. 1. Some examples of the wireless communications system 200 may support an improved wakeup signaling configuration for a DRX operation.

The base station 105-a may provide a network coverage for UEs 115 within geographic coverage area 110-a. In some examples, UEs 115 may support DRX operation with wakeup signals 210 for improved power efficiency. For example, a UE 115 may operate in a low power mode until signaled, via a wakeup signal 210, to transition into a higher power mode to support data transmission and reception. These wakeup signals 210 may be examples of reference signal-type signals or PDCCH-type signals. UEs 115 (e.g., the UE 115-a and the UE 115-b) may differentiate between wakeup signals 210 transmitted by base station 105-a based on different wakeup signal configurations.

In the wireless communications system 200 (e.g., a millimeter wave (mmW) system supporting beamforming), the base station 105-a may transmit wakeup signals 210 using a beam sweeping procedure. For example, the base station 105-a may transmit wakeup signals 210 on a downlink channel 205 (e.g., PDCCH) using a number of different downlink transmit beams 215. The base station 105-a may sweep through different transmit beams for transmitting the wakeup signaling to improve the reception reliability at the UEs 115. For example, when a UE 115 is in a low power mode (e.g., a sleep mode), the UEs 115 may experience some level of beam degradation, such as beam misalignment, beam blocking, etc.

To reduce the probability that the UEs 115 miss a wakeup signal 210 transmitted by the base station 105-a due to this beam degradation, the base station 105-a may use a variety of beam directions, beam widths, or both for transmitting the wakeup signal 210 to the UEs 115. If the UEs 115 successfully receives one or more of the wakeup signals 210 transmitted in the beam sweeping procedure, the UEs 115 may perform a wakeup procedure and transition to a higher power level to support data transmission and reception. The number of downlink transmit beams or the directions of the beams in the beam sweep may be dynamically determined by the base station 105-a. The UEs 115 may attempt to receive the wakeup signals 210 using a number of downlink receive beams 220. For example, the UE 115-a may monitor for wakeup signaling using downlink receive beams 220-a and the UE 115-b may monitor for wakeup signaling using downlink receive beams 220-b.

In some examples, each wakeup signal 210 may either be a UE-specific or group-specific wakeup signal 210. For example, the base station 105-a may transmit a UE-specific wakeup signal 210 to initiate a wakeup procedure at one particular UE 115. That is, each UE 115 may have a dedicated wakeup signal 210, dedicated signaling occasions, or both. This may result in a large network overhead (e.g., for the base station 105-a to transmit wakeup signals 210 for each UE 115 scheduled to wake up) but highly flexible and efficient wakeup signaling for improved UE power saving. The base station 105-a may transmit a wakeup signal 210-a on a downlink channel 205-a to wake up the UE 115-a and a wakeup signal 210-b on a downlink channel 205-b to wake up the UE 115-b. If the UE 115-b detects the wakeup signal 210-a, the UE 115-b may identify that the wakeup signal 210-a is intended for a different UE 115 and may not perform a wakeup procedure. Alternatively, the base station 105-a may transmit a group-specific wakeup signal 210 to wake up both the UE 115-a and the UE 115-b if both of the UEs 115 are in a same UE group. That is, each pre-defined or dynamically defined group of UEs 115 may share the same wakeup signal 210, wakeup signal monitoring occasion, or both. This may result in a low network overhead, but one or more UEs 115 may wake up based on a group-specific wakeup signal 210 even if the wakeup signal 210 is intended for another UE 115 in the same group. A UE 115 waking up even if there is no data to transmit or receive (e.g., a false wakeup) based on a group-specific wakeup signal 210 may incur a power penalty.

To support a large number of UEs 115 within a cell (e.g., the geographic coverage area 110-a) and address the shortcoming of standing UE-specific and group-specific wakeup signal configurations, UEs 115 may be configured to receive wakeup signals 210 according to a wakeup signal configuration including a set of wakeup grouping sets and a set of wakeup signal resources for wakeup signal monitoring occasions. Each wakeup grouping set of the set of wakeup grouping sets may include at least one group of one or more UEs 115, and for each wakeup grouping set, the UEs 115 may be a member of at least one group of each of the wakeup grouping set. Thus, the wakeup signal configuration described herein using wakeup grouping set may efficiently use resources to support wakeup procedures for multiple UEs 115 with minimal power penalties. That is, by configuring UEs 115 with wakeup grouping sets for wakeup occasions, the base station 105-a may initiate wakeup procedures with the UEs 115 and reduce occurrences of unnecessarily waking up other UEs 115 or groups of UEs 115.

The base station 105-a may generate a wakeup signal configuration to configure the UEs 115 with a set of wakeup grouping sets and a set of wakeup signal resources for wakeup signal monitoring occasions for a DRX operation. The monitoring occasions may include a pre-wakeup window of a C-DRX cycle. In an example, the base station 105-a may generate the wakeup signal configuration (e.g., the set of wakeup grouping sets and wakeup signal resources) based on a pattern, which may be a hopping pattern. In some examples, the base station 105-a may configure the set of wakeup grouping sets as a function of time. For example, the base station 105-a may identify an index associated with the monitoring occasion, and determine the wakeup grouping set for the monitoring occasion according to the identified hopping pattern and the index associated with the monitoring occasion. The index may include a system frame number, or a DRX cycle index, or a frequency resource index, or a carrier index, or a combination thereof.

In a general example, the base station 105-a may configure and store a wakeup signal configuration lookup table including different wakeup grouping sets with different UEs 115 or sets of UEs 115 belonging to different groups of different wakeup grouping sets.

TABLE 1

Generic Wakeup Signal Configuration Lookup Table

| Set | Group 1 | ... | Group n |
|---|---|---|---|
| 1 | UE1, ... | ... | UEn, ... |
| ... | ... | ... | ... |
| m | UEm, ... | ... | UEmn, ... |

The wakeup signal configuration lookup table may, in some examples, be a relational database including the wakeup signal configuration lookup table with a set of column and row elements. For example, the wakeup signal configuration lookup table may include a column indicating a set of wakeup grouping sets, which may include a number, N, of different sets of wakeup grouping sets. The wakeup signal configuration lookup table may also include a number, N, of columns indicating different groups associated with each set of wakeup grouping sets. Each wakeup grouping set of the set of wakeup grouping sets may, and more specifically each group associated with each set of wakeup grouping set may include an indication of one or more UEs 115 belonging to the group.

In some cases, the base station 105-a may configure and store a wakeup signal configuration lookup table (Table 2) including different wakeup grouping sets with different UEs 115, or sets of UEs 115, belonging to different groups of different wakeup grouping sets:

TABLE 2

Example of a Wakeup Signal Configuration Lookup Table

| Set | Group 1 | Group 2 | Group 3 |
| --- | --- | --- | --- |
| 1 | UE1, UE2, UE3 | UE4, UE5, UE6 | UE7, UE8, UE9 |
| 2 | UE2, UE3, UE4 | UE5, UE6, UE7 | UE8, UE9, UE1 |
| 3 | UE3, UE4, UE5 | UE6, UE7, UE8 | UE9, UE1, UE2 |

The wakeup signal configuration table may support wakeup grouping for DRX operation for different UEs 115. In some examples, the UEs 115 may store the wakeup signal configuration lookup table in memory, for example based on configuration signaling from base station 105-a, or another base station 105, that identifies the contents of the table. The base station 105-a may then transmit an indicator to the UEs 115 that indicates a specific wakeup grouping set in the lookup table for the UEs 115 to use for wakeup signal monitoring and reception. In other cases, base station 105-a may store the wakeup signal configuration lookup table in memory and may transmit an indication of one of the wakeup grouping sets to the UE 115.

For example, the wakeup signal configuration table may indicate at least three different wakeup grouping sets. In some examples, the wakeup signal configuration table may include more or less than three wakeup grouping sets. Each wakeup grouping set may include one or more groups of UEs 115 per wakeup grouping set. In some examples, the base station 105-a may facilitate the wakeup signal configuration in the wakeup signal configuration table based in part on the hopping pattern. Thus, the hopping pattern may indicate how the different sets of wakeup grouping sets are used by the base station 105-a, and thus determine how the UEs 115 monitor for (and receive) wakeup signals based on the wakeup group sets.

With reference to the wakeup signal configuration table (Table 2), UE1 may refer to the UE 115-a, while the UE2 may refer to the UE 115-b. UE3 through UE9 may refer to other UEs 115 (not shown). In a traffic imbalance scenario, some UEs 115 may have relatively high downlink traffic, while other UEs 115 may have relatively low traffic. For example, UE1 (e.g., the UE 115-a) may have downlink traffic, while the UE2 (e.g., the UE 115-b) may have no data traffic. Here, if a single wakeup grouping set (e.g., Set 1) is configured, UE2 and UE3 may continuously wake up unnecessarily, thereby incurring a power penalty. By configuring different wakeup grouping sets according to a hopping pattern, the power penalty of false wakeups can be reduced by sharing the power penalty across UEs 115. In other examples, the base station 105-a may wake up UE3 and UE4 because they may have downlink traffic. If a single wakeup grouping set (e.g., Set 1) is used, the base station 105-a may transmit two wakeup signals corresponding to the two different groups that UE3 and UE4 belong to (e.g., Group 1 and Group 2). With two wakeup signals, other additional UEs 115 (e.g., UE1, UE2, UE5, UE6) may wakeup unnecessarily and waste resources (e.g., power). However, by using multiple wakeup grouping sets, the base station 105-a may reduce false or unnecessary wakeups for other UEs 115. For example, the base station 105-a may select an appropriate wakeup grouping set (e.g., Set 2 or Set 3), which includes UE3 and UE4 in the same group (e.g., Group 1). As a result, the number of UEs 115 that have to wakeup unnecessarily is decreased (e.g., only UE2 will falsely wakeup rather than UE1, UE2, UE5, and UE6).

In some examples, the base station 105-a may determine, for a monitoring occasion, at least one resource of a set of wakeup signal resources associated with a group of the wakeup grouping sets that includes the UEs 115. That is, for a monitoring occasion, each group associated with a wakeup grouping set may be associated with at least one resource (e.g., time and frequency resource(s)). For example, a first group (e.g., Group 1) in the wakeup signal configuration table may be associated with a first resource, a second group (e.g., Group 2) in the wakeup signal configuration table may be associated with a second resource, and a third group (e.g., Group 3) in the wakeup signal configuration table may be associated with a third resource, etc. The resource(s) associated with (and between) each group in the wakeup grouping set may be same or different frequency resources, or different time resources, or different control channel signaling types, or different reference signal types, or different data payloads, or different RNTIs, or a combination thereof.

The base station 105-a may transmit, to the UEs 115, configuration signaling that configures a UE 115 with the set of wakeup grouping sets and the set of wakeup signal resources for wakeup signal monitoring occasions. For example, the base station 105-a may transmit the wakeup signal configuration to the UE 115-a on a downlink channel 205-a and to the UE 115-b on a downlink channel 205-b. In some examples, the base station 105-a may transmit the wakeup signal configuration via RRC signaling, for example, during a connection procedure (e.g., an RRC procedure, such as a cell acquisition procedure, a random-access procedure, an RRC connection procedure, an RRC configuration procedure). Upon receiving the wakeup signal configuration, the UEs 115 may determine, for a monitoring occasion, a wakeup grouping set of the set of wakeup grouping sets, and more specifically determine a group in a wakeup grouping set that includes the UEs 115. For example, the UE 115-a may determine a group in a wakeup grouping set that includes the UE 115-a, while the UE 115-b may determine a same or different group in a wakeup grouping set that includes the UE 115-b. In some examples, the UEs 115 may belong to a same or different group.

Following the configuring of the UEs 115 with the wakeup signal configuration, the base station 105-a may select a specific group of a wakeup grouping set that has a UE 115 (e.g., the UE 115-a, the UE 115-b) for which the base station 105-a may have data for communications, and transmit a wakeup signal during a monitoring occasion using one or more wakeup signal resources. When receiving the wakeup signal, the UEs 115 may identify the selected group of the wakeup grouping set according to a hopping pattern and index of the monitoring occasion. For example, the UE 115-a may identify an index associated with a monitoring occasion, and determine the selected group of the wakeup grouping set for the monitoring occasion according to the identified hopping pattern and the index associated with the monitoring occasion. The index may include a system frame number, or a DRX cycle index, or a frequency resource index, or a carrier index, or a combination thereof.

Additionally, or alternatively, the UEs 115 may identify the selected group of the wakeup grouping set according to a set of decoding hypotheses. For example, with reference to wakeup signal configuration table, UE1 (e.g., the UE 115-a) belongs to a first wakeup grouping set (e.g., Set 1) and a first group (e.g., Group 1) of the first wakeup grouping set, a second wakeup grouping set (e.g., Set 2) and a third group (e.g., Group 3) of the second wakeup grouping set, and a third wakeup grouping set (e.g., Set 3) and a third group (e.g., Group 3) of the third wakeup grouping set. Here, the UE1 (e.g., the UE 115-a) may blindly decode three wakeup signal candidates and if at least one is detected, the UE1 may proceed to initiate a wakeup procedure. For example, the UE 115-a may attempt to decode the wakeup signal 210-a according to a set of decoding hypotheses that corresponds to the set of wakeup grouping sets, and determine a successful decoding hypothesis of the set of decoding hypotheses. As a result, the UE 115-a may identify the wakeup grouping set that corresponds to the successful decoding hypothesis and initiate a wakeup procedure for the UE 115-a. The wakeup procedure may include switching to an active mode to monitor a control channel subsequent to initiating the wakeup procedure. For example, subsequently, the UE 115-a may receive, within the control channel, a grant from the base station 105-a and communicate with the base station 105-a based in part on the grant.

Therefore, the techniques described herein may reduce or eliminate latencies associated with processes related to wakeup signaling for a DRX operation, and more specifically enable the base station 105-a to configure the UEs 115 with wakeup grouping for a DRX operation to improve power savings of the UEs 115. As a result, the UEs 115 may experience reduced, or no occurrences of false wakeups.

Figure 3:
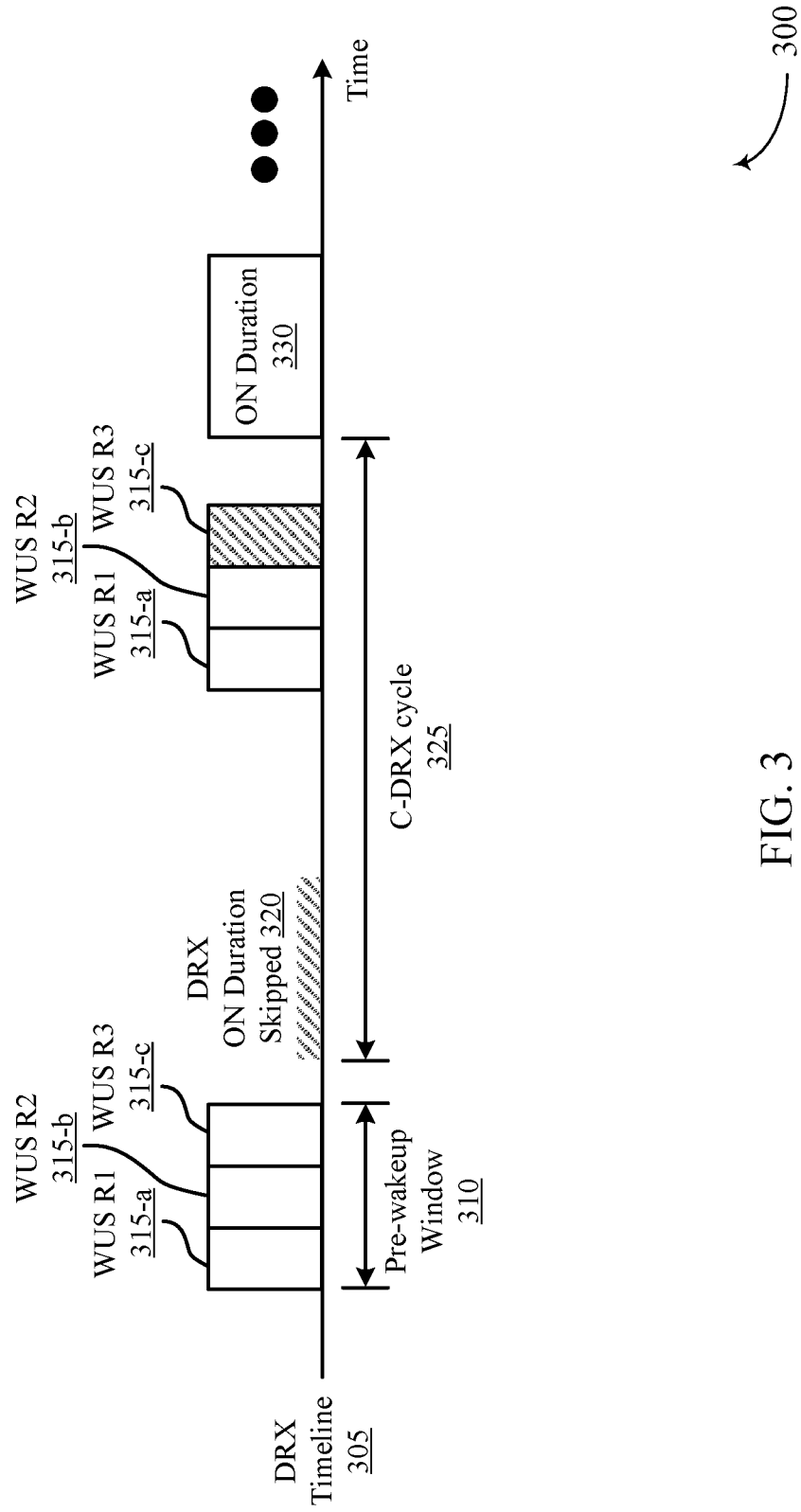
FIGS. 3 and 4 illustrate examples of wakeup procedure timelines that support wakeup grouping for DRX operation in accordance with aspects of the present disclosure.

FIG. 3 illustrates an example of a wakeup procedure timeline 300 that supports wakeup grouping for DRX operation in accordance with aspects of the present disclosure. The wakeup procedure timeline 300 may correspond to wakeup signaling between a base station 105 and a UE 115, which may be examples of the corresponding devices described with respect to FIGS. 1 and 2. Some examples of the wakeup procedure timeline 300 may support an improved wakeup signaling configuration for the DRX operation. While the wakeup signal configuration for the wakeup procedure timeline 300, as illustrated, shows one possible wakeup signal configuration, many other configurations are possible using any of the techniques described herein.

Traffic behavior (e.g., data transmission and reception) may often vary between the base station 105 and the UE 115, for example, with occasional periods of transmission activity followed by longer periods of silence. From a latency perspective, it may be beneficial for the UE 115 to monitor a control channel (e.g., PDCCH) for downlink control signaling from the base station 105 to receive uplink grants or downlink data transmissions and instantaneously react on changes in the traffic behavior. However, at the same time, it may be costly for the UE 115 in terms of power consumption. To reduce power consumption at the UE 115, the UE 115 may operate in a DRX mode. For example, a UE 115 may operate in a DRX mode according to a DRX timeline 305.

The DRX timeline 305 may include a DRX cycle (e.g., C-DRX cycle 325), which may be configurable in length (e.g., duration of a DRX cycle may be adaptable). With a DRX cycle configured, the UE 115 may monitor a control channel for a wakeup signal (or other signaling (e.g., downlink control signaling)) during a portion of the DRX cycle in a low power mode, and switch to a sleep mode during the remaining portion of the DRX cycle. This allows for significant reductions in power consumption. In some examples, the longer the DRX cycle, the lower the power consumption. However, in some examples, the DRX cycle may be a short DRX cycle (e.g., 20 ms).

In some examples, the DRX timeline 305 may include a pre-wakeup window 310 (that may be part or separate from a DRX cycle), in which a UE 115 may, as part of a pre-wakeup procedure, monitor a control channel for one or more wakeup signals from the base station 105. The pre-wakeup procedure may involve the UE 115 transitioning to a higher power level than the sleep mode, but a lower power level than the active mode, to monitor for wakeup signals from the base station 105. The UE 115 may monitor one or more wakeup signal resources (e.g., time and frequency resources) for one or more wakeup signals from the base station 105 using a set of downlink receive beams. As explained with reference to FIG. 2, the UE 115 may be configured with a set of wakeup grouping sets and a set of wakeup signal resources for monitoring occasions. In the example of FIG. 3, the set of wakeup signal resources may include a first wakeup signal resource 315-a, a second wakeup signal resource 315-b, and a third wakeup signal resource 315-c.

The UE 115, in the example of FIG. 3, may belong to at least one wakeup grouping set that may correspond to at least one of the wakeup signal resources 315. By way of example, the UE 115 may belong to a first wakeup grouping set and within the set the UE 115 may be designated the third wakeup signal resource 315-c. That is, the UE 115 may monitor the wakeup signal resource 315-c (e.g., time and frequency resources) for one or more wakeup signals from the base station 105 using a set of downlink receive beams. In some examples, during the pre-wakeup window 310, the base station 105 may not have data to transmit to the UE 115 or receive from the UE 115. Thus, the base station 105 may not transmit a wakeup signal to the UE 115 (e.g., on the wakeup signal resource 315-c). If the UE 115 does not detect or otherwise receive a wakeup signal on a wakeup signal resource (e.g., the wakeup signal resources 315) that corresponds to a group that includes the UE 115, the UE 115 may skip a DRX ON duration at 320 for the C-DRX cycle 325 and may return to the lower power mode (e.g., go back to sleep). In this way, the UE 115 may reduce its power consumption by not entering a DRX ON duration when there is no data scheduled for reception or transmission.

In some examples, the base station 105 may identify data to transmit to the UE 115 or data to receive from the UE 115. In this example, the base station 105 may transmit a wakeup signal to the UE 115 on a wakeup signal resource (e.g., the wakeup signal resources 315) that corresponds to a group that includes the UE 115 using a beam sweeping procedure (e.g., transmitting the wakeup signal using a number of downlink transmit beams). The UE may pre-wake up during C-DRX cycle 325 and may attempt to detect the wakeup signal using a set of downlink receive beams. If the UE 115 detects the wakeup signal on one or more downlink receive beams and on a wakeup signal resource (e.g., the wakeup signal resources 315) that corresponds to a group that includes the UE 115, the UE 115 may perform a full wakeup procedure to transmit or receive the scheduled data in an ON duration 330. For example, the UE 115 may receive a wakeup signal during a monitoring occasion (of the C-DRX cycle 325) on the wakeup signal resource 315-c, determine a wakeup grouping set of the set of wakeup grouping sets associated with the monitoring occasion, and detect, based in part on the identified wakeup grouping set, that the wakeup signal is in at least the wakeup resource set 315-c. Therefore, the UE 115 may identify that the wakeup signal is intended for the UE 115 based on the identified wakeup grouping set and that the wakeup signal is in at least the wakeup resource set 315-c.

Thus, the techniques described herein may provide efficacy to the base station 105 and the UE 115 by reducing or eliminating latencies associated with processes related to wakeup signaling for DRX operation, and more specifically enabling the base station 105 to configure the UE 115 with wakeup grouping for DRX operation to improve power savings of the UE 115. As a result, the UE 115 may experience none or at least reduced occurrences of false wakeups.

Figure 4:
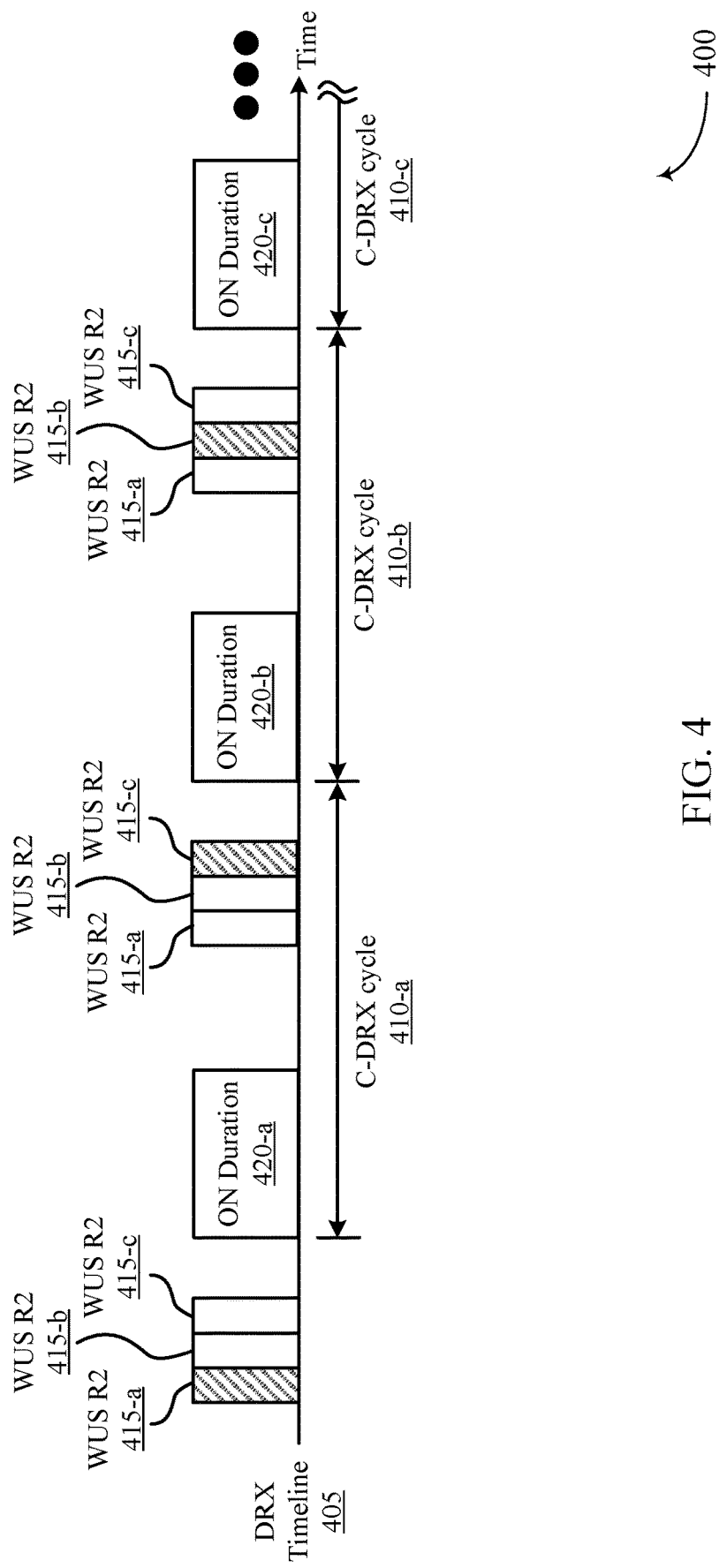

FIG. 4 illustrates an example of a wakeup procedure timeline 400 that supports wakeup grouping for DRX operation in accordance with aspects of the present disclosure. The wakeup procedure timeline 400 may correspond to wakeup signaling between a base station 105 and one or more UEs 115, which may be examples of the corresponding devices described with respect to FIGS. 1 and 2. Some examples of the wakeup procedure timeline 400 may support an improved wakeup signaling configuration for DRX operation, and more specifically a wakeup signaling configuration according to a hopping pattern. By configuring different wakeup grouping sets according to a hopping pattern, a power penalty of false wakeups can be reduced by sharing the power penalty across different UEs 115. While the wakeup signal configuration for the wakeup procedure timeline 400, as illustrated, shows one possible wakeup signal configuration, many other configurations are possible using any of the techniques described herein.

A DRX timeline 405 illustrates the operations performed by a UE 115. For example, the UE 115 may monitor a channel (e.g., a PDCCH) for one or more wakeup signals from a base station 105 during a C-DRX cycle 410-a. Here, the UE 115 may monitor one or more wakeup signal resources (e.g., time and frequency resources) for one or more wakeup signals from the base station 105 using a set of downlink receive beams. As explained with reference to FIG. 2, the UE 115 may be configured with a set of wakeup grouping sets and a set of wakeup signal resources for monitoring occasions. In the example of FIG. 4, the set of wakeup signal resources may include a first wakeup signal resource 415-a, a second wakeup signal resource 415-b, and a third wakeup signal resource 415-c.

The UE 115, in the example of FIG. 4, may belong to at least one wakeup grouping set that may correspond to at least one of the wakeup signal resources 415. By way of example, the UE 115 may belong to a first wakeup grouping set and within the set, the UE 115 may be designated the second wakeup signal resource 415-b. That is, the UE 115 may monitor the wakeup signal resource 415-b (e.g., time and frequency resources) for one or more wakeup signals from the base station 105 using a set of downlink receive beams. In some examples, during the C-DRX cycle 410-a, the base station 105 may not have data to transmit to the UE 115 or receive from the UE 115. Thus, the base station 105 may not transmit a wakeup signal to the UE 115 on the wakeup signal resource 415-b.

In some examples, if the UE 115 does not detect or otherwise receive a wakeup signal on a wakeup signal resource (e.g., wakeup signal resources 415-b) that corresponds to a group that includes the UE 115, the UE 115 may skip a DRX ON duration 420-a and may return to the lower power mode (e.g., go back to sleep). In this way, the UE 115 may reduce its power consumption by not entering a DRX ON duration when there is no data scheduled for reception or transmission. In some examples, during the C-DRX cycle 410-a, the base station 105 may have data to transmit to another UE 115 or receive from the other UE 115. Here, the base station 105 may transmit, to the other UE 115, a wakeup signal on a wakeup signal resource (e.g., the wakeup signal resource 415-a) that corresponds to a group that includes the other UE 115. Additionally, during the C-DRX cycle 410-b, the base station 105 may not have data to transmit to the UE 115 or receive from the UE 115. Thus, the base station 105 may not transmit a wakeup signal to the UE 115 on the wakeup signal resource 415-b during the C-DRX cycle 410-b, and the UE 115 may skip a DRX ON duration 420-b. However, the base station 105 may have data to transmit to another UE 115 or receive from the other UE 115. Here, the base station 105 may transmit, to the other UE 115, a wakeup signal on a wakeup signal resource (e.g., the wakeup signal resource 415-c) that corresponds to a group that includes the other UE 115.

During the C-DRX cycle 410-c, the base station 105 may identify data to transmit to the UE 115 or data to receive from the UE 115. In this example, the base station 105 may transmit a wakeup signal to the UE 115 on a wakeup signal resource (e.g., the wakeup signal resources 415-b) that corresponds to a group that includes the UE 115 using a beam sweeping procedure (e.g., transmitting the wakeup signal using a number of downlink transmit beams). The UE 115 may pre-wake up during the C-DRX cycle 410-c and may attempt to detect the wakeup signal using a set of downlink receive beams. If the UE 115 detects the wakeup signal on any of these downlink receive beams and on a wakeup signal resource (e.g., the wakeup signal resources 415-b) that corresponds to a group that includes the UE 115, the UE 115 may initiate and perform a full wakeup procedure to transmit or receive the scheduled data in an ON duration 420-c.

In some examples, the UE 115 may be configured with a particular decoding hypothesis for successfully decoding a received wakeup signal according to the wakeup signal configuration for the UE 115. For example, the UE 115 may attempt to decode the wakeup signal according to a set of decoding hypotheses that corresponds to the set of wakeup grouping sets and determine a successful decoding hypothesis of the set of decoding hypotheses. As a result, the UE 115 may identify the wakeup grouping set that corresponds to the successful decoding hypothesis and initiate a wakeup procedure for the UE 115. The wakeup procedure may include switching to an active mode to monitor a control channel subsequent to initiating the wakeup procedure. For example, the UE 115 may receive, within the control channel, a grant from the base station 105 and communicate with the base station 105 based in part on the grant.

Thus, the techniques described herein may reduce or eliminate latencies associated with processes related to wakeup signaling for DRX operation, and more specifically enabling the base station 105 to configure the UE 115 with wakeup grouping for DRX operation to improve power savings of the UE 115. As a result, the UE 115 may experience none or at least reduced occurrences of false wakeups. For example, in a traffic imbalance scenario, some UEs 115 may have relatively high downlink traffic, while other UEs 115 may have relatively low traffic. For example, a UE 115 associated with the wakeup signal resource 415-*a* may have downlink traffic, another UE 115 associated with the wakeup signal resource 415-*b* may have no data traffic. Here, if a single wakeup grouping set is configured, the two UEs 115 may wake up unnecessarily, thereby incurring a power penalty. By configuring different wakeup grouping sets and corresponding different wakeup signal resources (e.g., according to a hopping pattern), the power penalty of false wakeups can be reduced by sharing the power penalty across the UEs 115.

Figure 5:
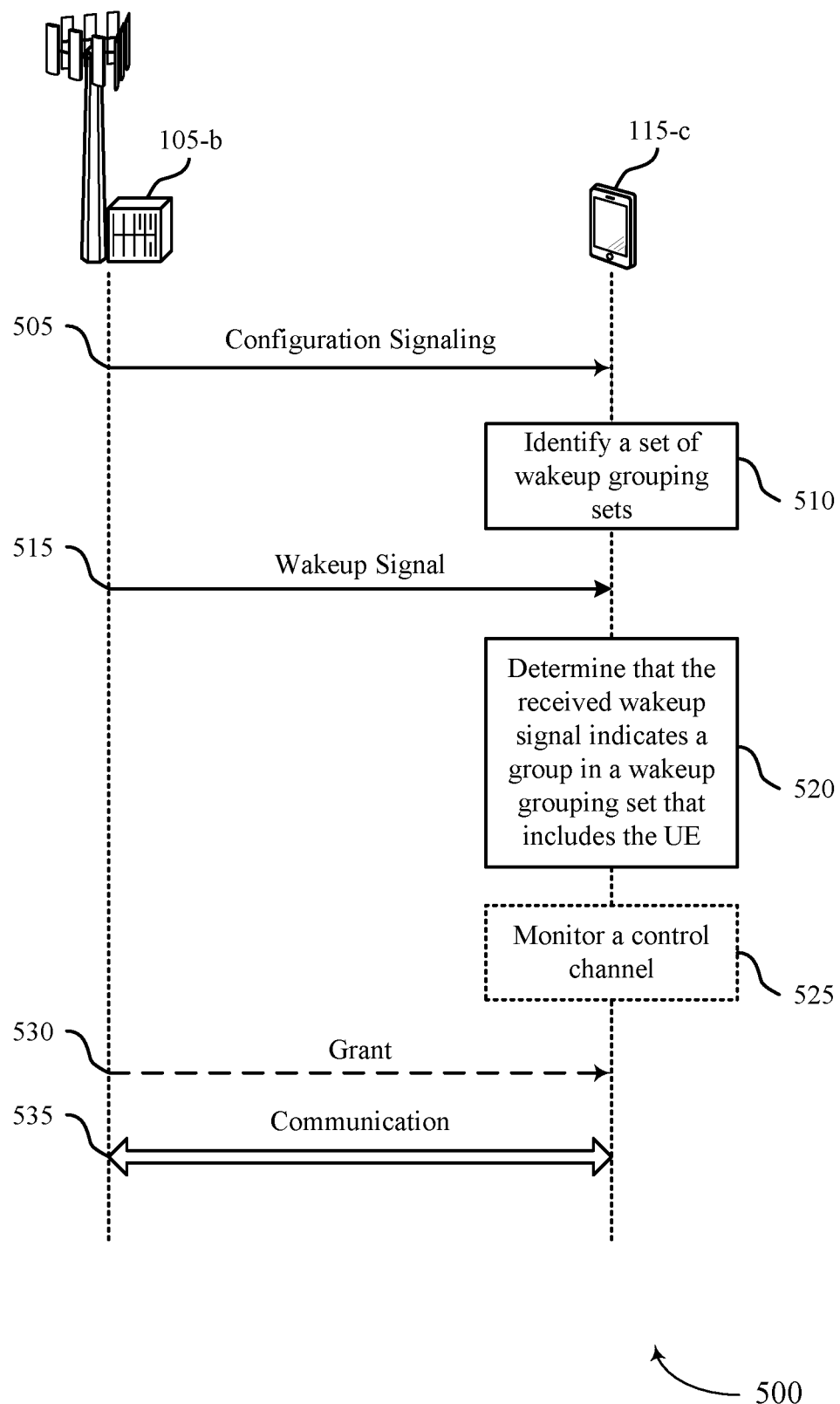
FIG. 5 illustrates an example of a process flow that supports wakeup grouping for DRX operation in accordance with aspects of the present disclosure.

FIG. 5 illustrates an example of a process flow 500 that supports wakeup grouping for DRX operation in accordance with aspects of the present disclosure. The process flow 500 may include a base station 105-*b* and a UE 115-*c*, which may be examples of the corresponding devices described with reference to FIGS. 1 through 4. In some examples, the process flow 500 may implement aspects of the wireless communications systems 100 and 200. For example, the base station 105-*b* and the UE 115-*c* may support an improved wakeup signaling configuration for DRX operation.

In the following description of the process flow 500, the operations between the base station 105-*b* and the UE 115-*c* may be performed in a different order than the exemplary order shown, or the operations performed by the base station 105-*b* and the UE 115-*c* may be performed in different orders or at different times. Certain operations may also be left out of the process flow 500, or other operations may be added to the process flow 500. The process flow 500 may, in some examples, commence with the base station 105-*b* establishing a connection with the UE 115-*c* (e.g., performing a cell acquisition procedure, a random access procedure, an RRC connection procedure, an RRC configuration procedure).

At 505, the base station 105-*b* may transmit configuration signaling to the UE 115-*c*. The configuration signaling may configure the UE 115-*c* with a set of wakeup grouping sets. At 510, the UE 115-*c* may identify a set of wakeup grouping sets, for example, based in part on the configuration signaling. In some examples, the base station 105-*b* may generate a wakeup signaling lookup table, and each index in the lookup table may correspond to a respective wakeup grouping set and at least one group of one or more UEs. The UE 115-*c* may be provided (or pre-configured) with the wakeup signaling lookup table. Here, the configuration signaling may include an indication (e.g., an index value) that maps to a wakeup grouping set, and more specifically to a group in the wakeup grouping set.

At 515, the base station 105-*c* may transmit a wakeup signal to the UE 115-*c*. The UE 115-*c* may monitor a control channel for a wakeup signal transmission from the base station 105-*c*. For example, during a monitoring occasion, the UE 115-*c* may monitor a wakeup signal resource for a wakeup signal transmission based in part on the wakeup signal configuration to identify if the UE 115-*c* should wake up for data communication. In some examples, the base station 105-*b* may not identify data for communication with the UE 115-*c*. Accordingly, the base station 105-*b* may not transmit a wakeup signal to the UE 115-*c* during the monitoring occasion. If the UE 115-*c* does not detect a wakeup signal, the UE 115-*c* may remain in the low power mode. However, in other examples, the base station 105-*b* may identify data for communication with the UE 115-*c*, and therefore transmit a wakeup signal to the UE 115-*c*. At 520, the UE 115-*c* may determine that the received wakeup signal indicates a group in a wakeup grouping set that includes the UE 115-*c*.

At 525, the UE 115-*c* may optionally monitor a control channel after waking up. For example, the UE 115-*c* may transition from the low power mode to a high power mode. In the high power mode during an ON duration, the UE 115-*c* may monitor a control channel (e.g., the PDCCH) for a scheduling grant. At 530, the base station 105-*b* may transmit a grant to the UE 115-*c* on the PDCCH, where the grant schedules the UE 115-*c* for data transmission, data reception, or both during an active duration. At 535, the UE 115-*c* and the base station 105-*b* may communicate according to the scheduling grant.

Figure 6:
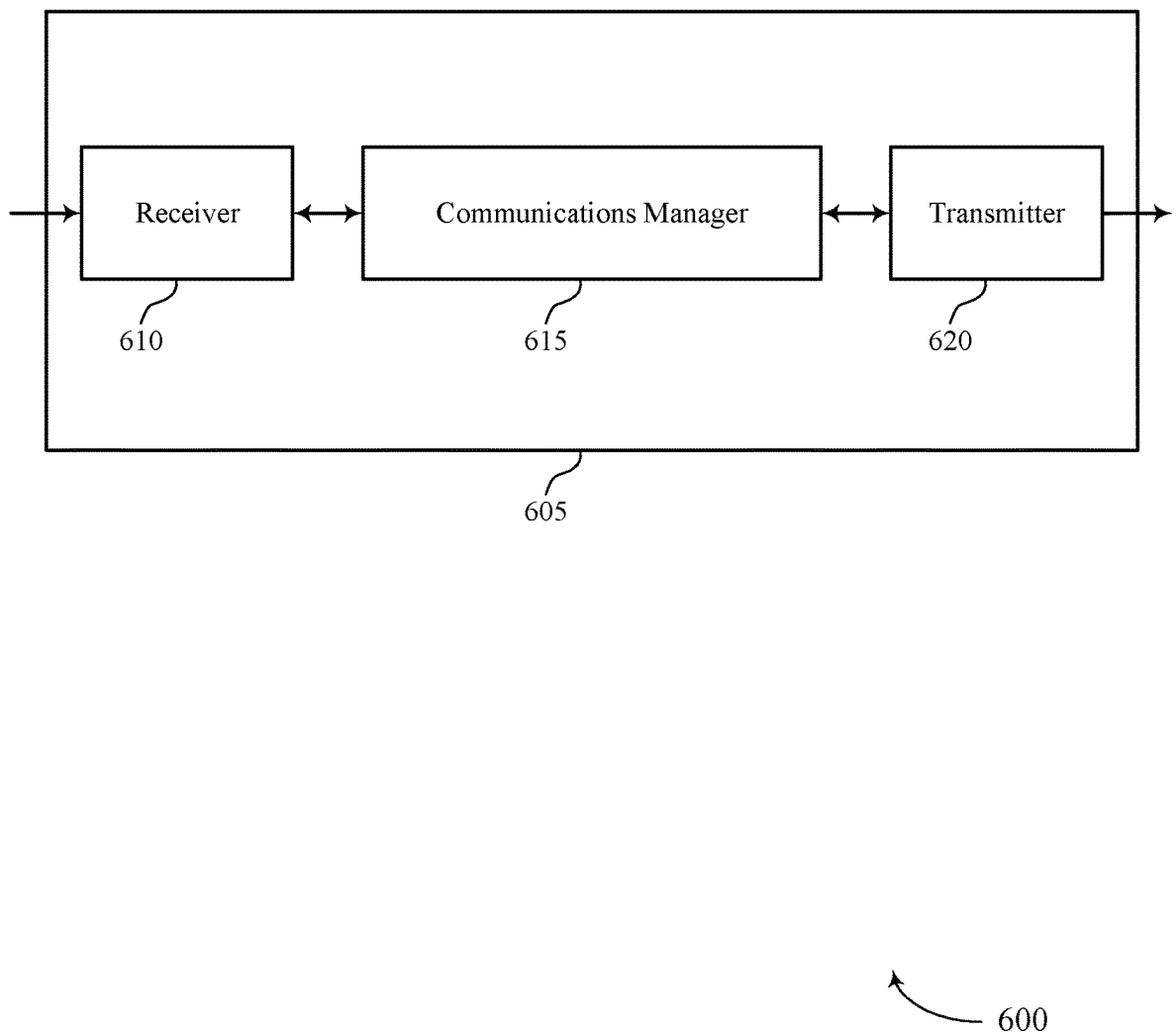
FIGS. 6 and 7 show block diagrams of devices that support wakeup grouping for DRX operation in accordance with aspects of the present disclosure.

FIG. 6 shows a block diagram 600 of a device 605 that supports wakeup grouping for DRX operation in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to wakeup grouping for DRX operation, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive signaling configuring the UE with a set of wakeup grouping sets, each of the set of wakeup grouping sets identifying a set of groups of one or more UEs, receive a wakeup signal during a monitoring occasion for wakeup signals, determine that the received wakeup signal indicates a group in a wakeup grouping set of the wakeup grouping sets, where the group includes the UE, and initiate a wakeup procedure for the UE based on the determining. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
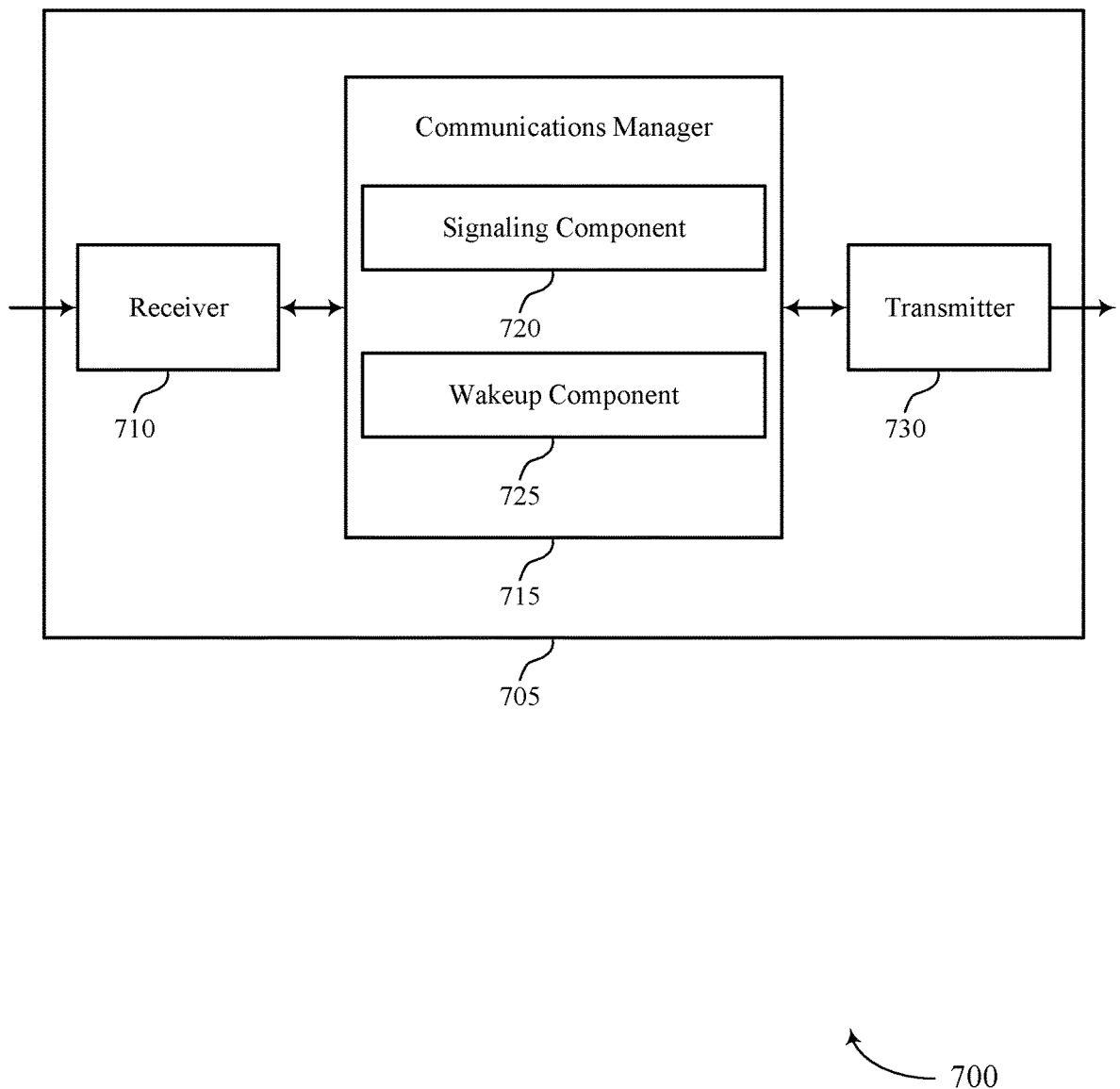

FIG. 7 shows a block diagram 700 of a device 705 that supports wakeup grouping for DRX operation in accordance with aspects of the present disclosure. The device 705 may be an example of aspects of a device 605, or a UE 115 as described herein. The device 705 may include a receiver 710, a communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to wakeup grouping for DRX operation, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a signaling component 720 and a wakeup component 725. The communications manager 715 may be an example of aspects of the communications manager 910 described herein.

The operations performed by the communications manager 715 as described herein may be implemented to realize one or more potential advantages. One implementation may enable UEs to receive wakeup signals according to configured groups within wakeup grouping sets. Such configured groups may reduce false wakeup occurrences, resulting in higher data rates and more efficient communications (e.g., less communication errors), among other advantages.

Based on implementing the indications as described herein, a processor of a UE or base station (e.g., a processor controlling the receiver 710, the communications manager 715, the transmitter 730, or a combination thereof) may reduce the impact or likelihood of false wakeup occurrences in a communications system while ensuring efficient communications. For example, the UE configurations described herein may leverage wakeup grouping sets as well as groups of UEs within the sets to divide the power penalty across the UEs, which may realize reduced signaling overhead and power savings, among other benefits.

The signaling component 720 may receive signaling configuring the UE with a set of wakeup grouping sets, each of the set of wakeup grouping sets identifying a set of groups of one or more UEs. The wakeup component 725 may receive a wakeup signal during a monitoring occasion for wakeup signals, determine that the received wakeup signal indicates a group in a wakeup grouping set of the wakeup grouping sets, where the group includes the UE, and initiate a wakeup procedure for the UE based on the determining.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

Figure 8:
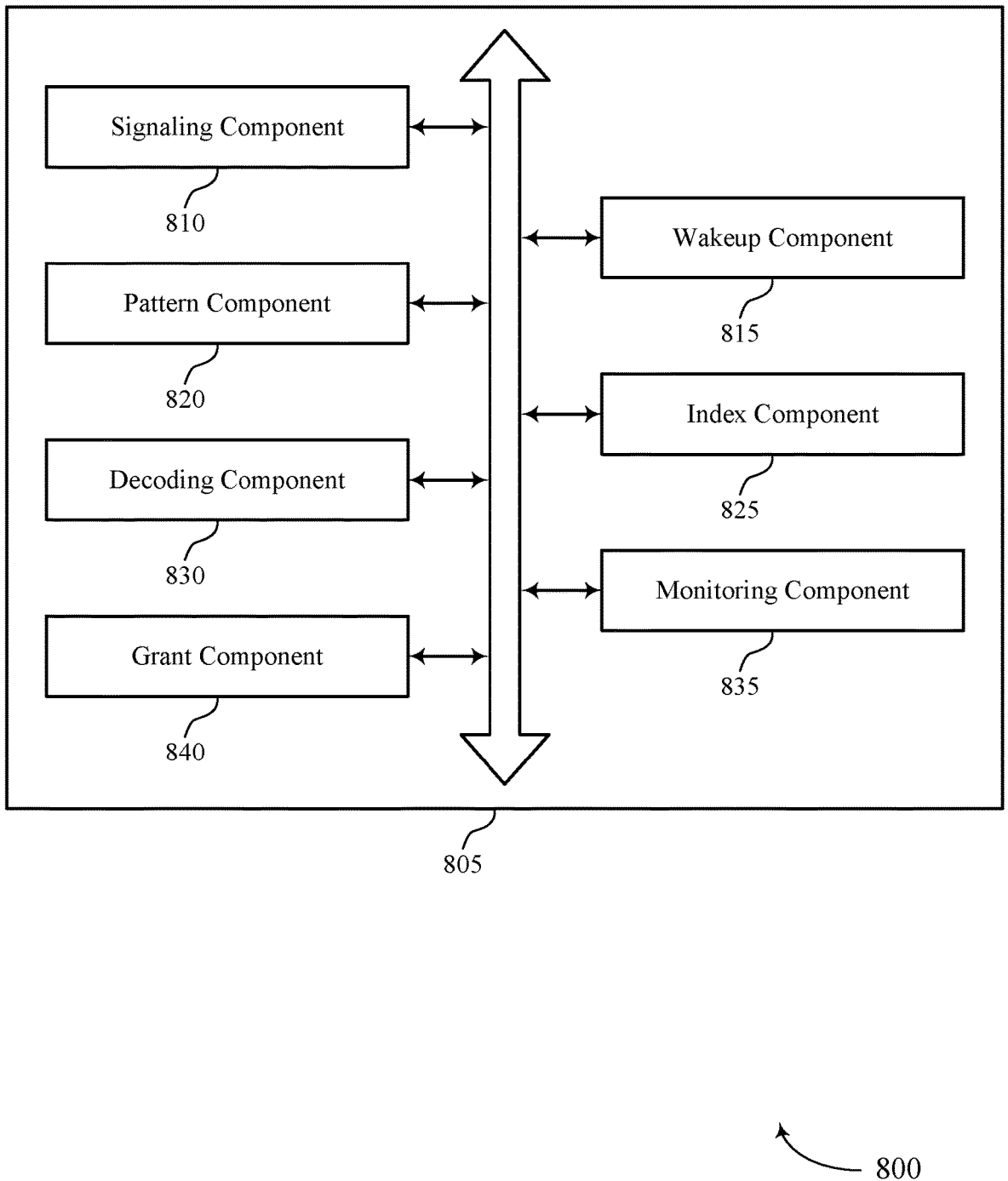
FIG. 8 shows a block diagram of a communications manager that supports wakeup grouping for DRX operation in accordance with aspects of the present disclosure.

FIG. 8 shows a block diagram 800 of a communications manager 805 that supports wakeup grouping for DRX operation in accordance with aspects of the present disclosure. The communications manager 805 may be an example of aspects of a communications manager 615, a communications manager 715, or a communications manager 910 described herein. The communications manager 805 may include a signaling component 810, a wakeup component 815, a pattern component 820, an index component 825, a decoding component 830, a monitoring component 835, and a grant component 840. Each of these modules may communicate, directly or indirectly, with one another (e.g., via one or more buses).

The signaling component 810 may receive signaling configuring the UE with a set of wakeup grouping sets, each of the set of wakeup grouping sets identifying a set of groups of one or more UEs. In some examples, the signaling component 810 may receive RRC signaling from a base station indicating the set of wakeup grouping sets. In some examples, each wakeup grouping set of the set of wakeup grouping sets, the one or more UEs are members of at least one group of the set of groups. In some cases, each group of the set of groups is associated with a different resource than each other group of the set of groups. In some cases, the resource includes a frequency resource, or a time resource, or a control channel signaling type, or a reference signal type, or a data payload, or a radio network temporary identifier, or a combination thereof. In some cases, the monitoring occasion includes a pre-wakeup window of a connected mode DRX cycle.

The wakeup component 815 may receive a wakeup signal during a monitoring occasion for wakeup signals. In some examples, the wakeup component 815 may determine that the received wakeup signal indicates a group in a wakeup grouping set of the wakeup grouping sets, where the group includes the UE. In some examples, the wakeup component 815 may initiate a wakeup procedure for the UE based on the determining. In some cases, the received wakeup signal includes one or more reference signals, or control channel signaling, or one or more predetermined sequences, or a combination thereof. In some cases, the one or more reference signals include a channel state information reference signal, or a tracking reference signal, or a demodulation reference signal, or a synchronization signal, or a combination thereof. In some cases, the one or more predetermined sequences include a pseudo-noise code sequence, or a Gold sequence, or a Zadoff-Chu sequence, or a combination thereof.

The pattern component 820 may identify a hopping pattern for the set of wakeup grouping sets. In some examples, the pattern component 820 may determine the wakeup grouping set for the monitoring occasion according to the identified hopping pattern. The index component 825 may identify an index associated with the monitoring occasion, the index including a system frame number, or a DRX cycle index, or a frequency resource index, or a carrier index, or a combination thereof. In some examples, the index component 825 may determine the wakeup grouping set for the monitoring occasion according to the identified hopping pattern and the index associated with the monitoring occasion.

The decoding component 830 may attempt to decode the received wakeup signal according to a set of decoding hypotheses that correspond to the set of wakeup grouping sets. In some examples, the decoding component 830 may determine a successful decoding hypothesis of the set of decoding hypotheses. In some examples, the decoding component 830 may identify the wakeup grouping set as corresponding to the successful decoding hypothesis.

The monitoring component 835 may monitor a control channel subsequent to initiating the wakeup procedure. The grant component 840 may receive, within the control channel, a grant from a base station serving the UE. In some examples, the grant component 840 may communicate with the base station based on the grant. In some examples, the grant component 840 may resources of the monitored control channel are different than resources of the monitoring occasion for wakeup signals.

Figure 9:
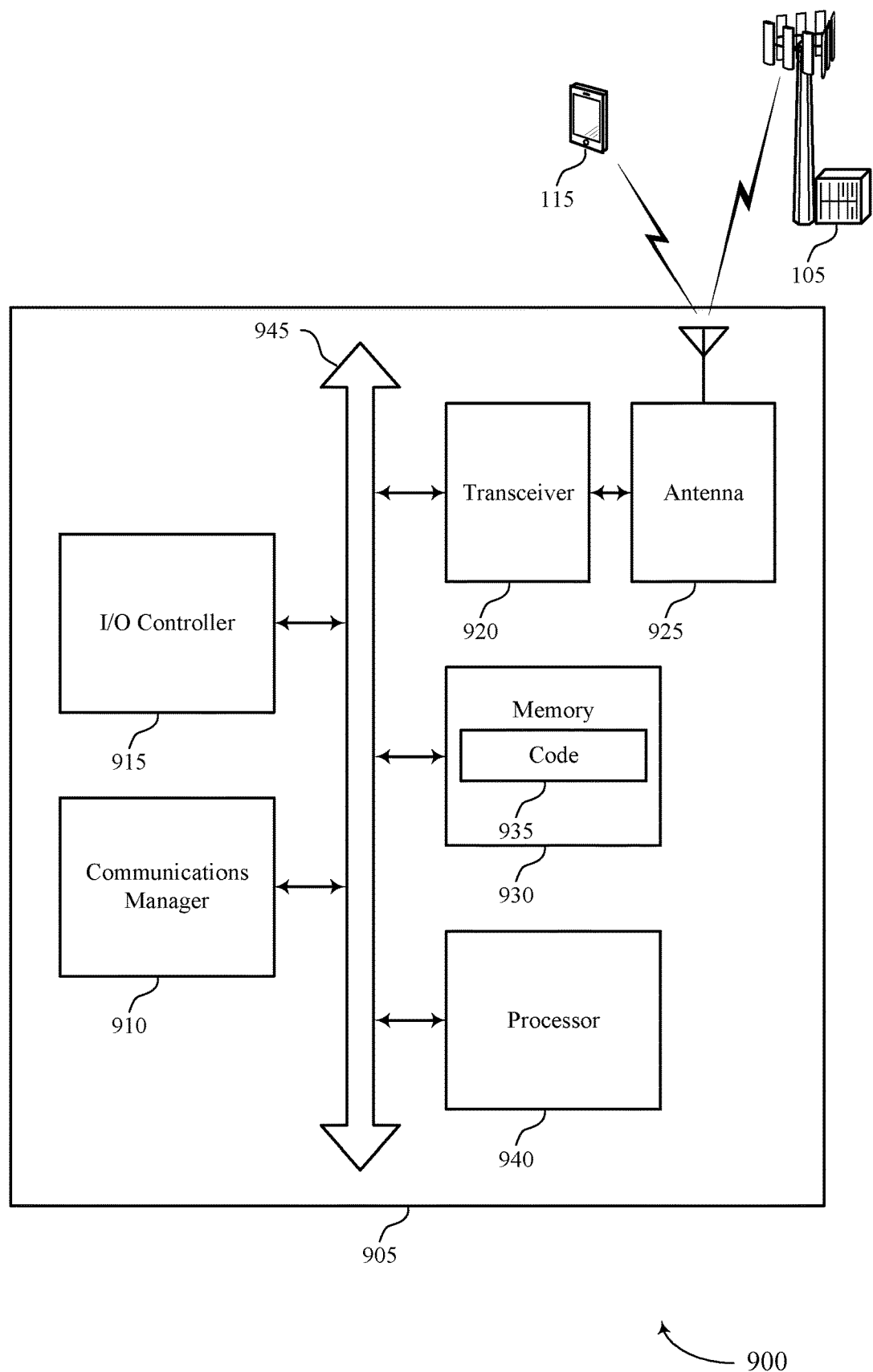
FIG. 9 shows a diagram of a system including a device that supports wakeup grouping for DRX operation in accordance with aspects of the present disclosure.

FIG. 9 shows a diagram of a system 900 including a device 905 that supports wakeup grouping for DRX operation in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive signaling configuring the UE with a set of wakeup grouping sets, each of the set of wakeup grouping sets identifying a set of groups of one or more UEs, receive a wakeup signal during a monitoring occasion for wakeup signals, determine that the received wakeup signal indicates a group in a wakeup grouping set of the wakeup grouping sets, where the group includes the UE, and initiate a wakeup procedure for the UE based on the determining.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS, ANDROID, MS-DOS, MS-WINDOWS, OS/2, UNIX, LINUX, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases, the device 905 may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting wakeup grouping for DRX operation).

Figure 10:
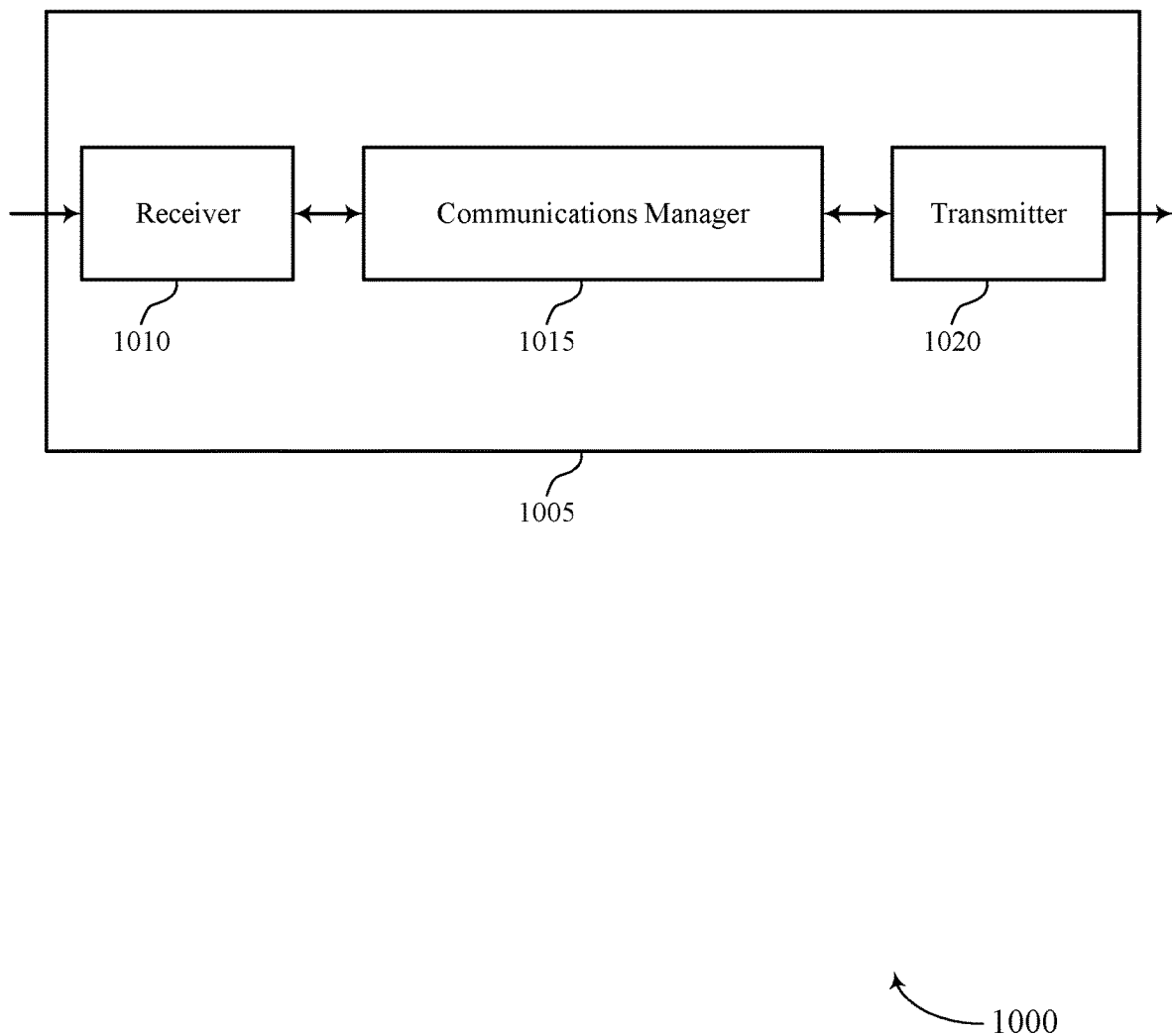
FIGS. 10 and 11 show block diagrams of devices that support wakeup grouping for DRX operation in accordance with aspects of the present disclosure.

FIG. 10 shows a block diagram 1000 of a device 1005 that supports wakeup grouping for DRX operation in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to wakeup grouping for DRX operation, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, signaling configuring the UE with a set of wakeup grouping sets, each of the set of wakeup grouping sets identifying a set of groups of one or more UEs, determine, for a monitoring occasion, a wakeup grouping set of the set of wakeup grouping sets, the determined wakeup grouping set including a group that includes the UE, and transmit, during the monitoring occasion, a wakeup signal for the group according to the determined wakeup grouping set. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
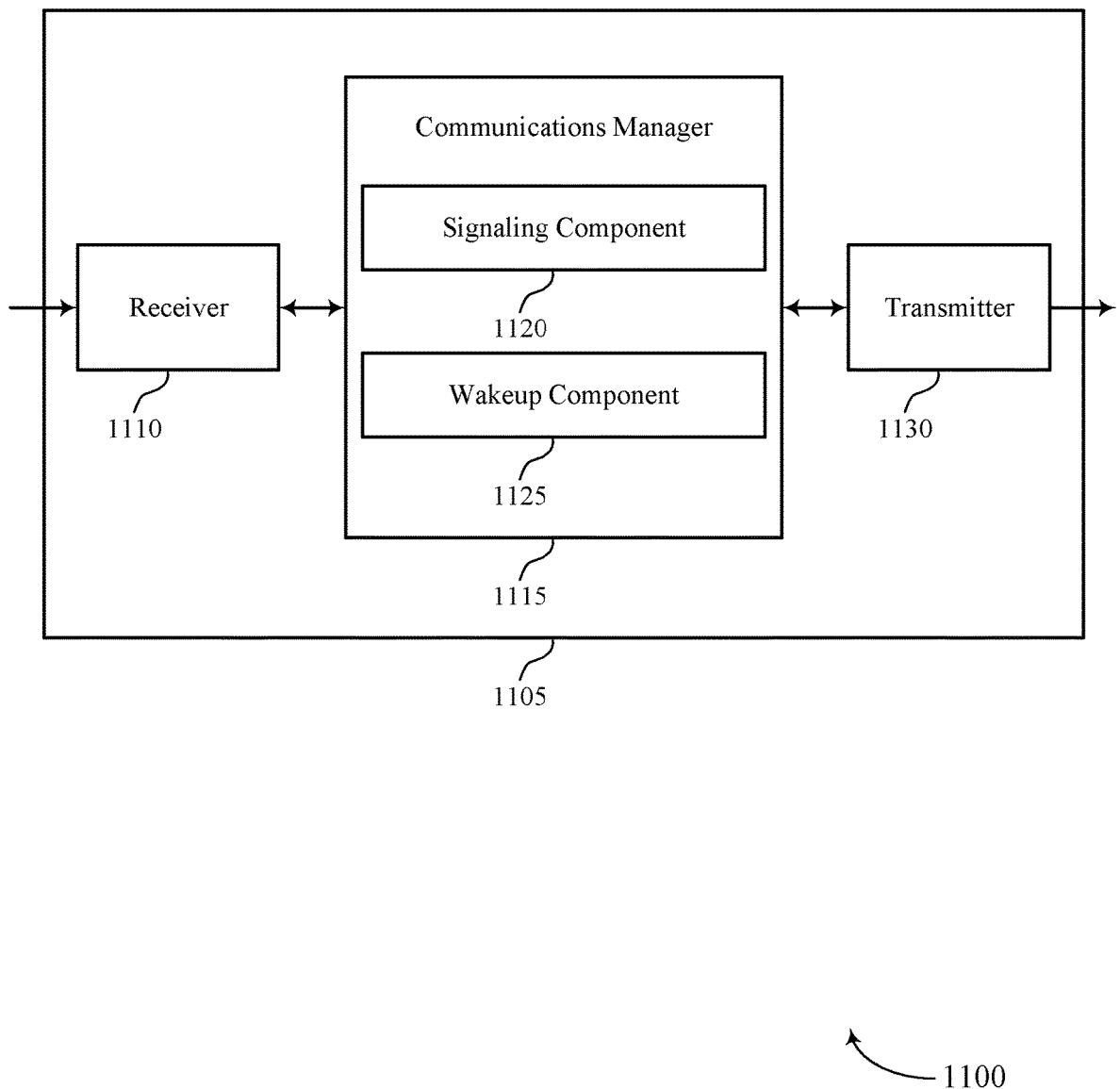

FIG. 11 shows a block diagram 1100 of a device 1105 that supports wakeup grouping for DRX operation in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to wakeup grouping for DRX operation, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a signaling component 1120 and a wakeup component 1125. The communications manager 1115 may be an example of aspects of the communications manager 1310 described herein. The signaling component 1120 may transmit, to a UE, signaling configuring the UE with a set of wakeup grouping sets, each of the set of wakeup grouping sets identifying a set of groups of one or more UEs. The wakeup component 1125 may determine, for a monitoring occasion, a wakeup grouping set of the set of wakeup grouping sets, the determined wakeup grouping set including a group that includes the UE and transmit, during the monitoring occasion, a wakeup signal for the group according to the determined wakeup grouping set.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
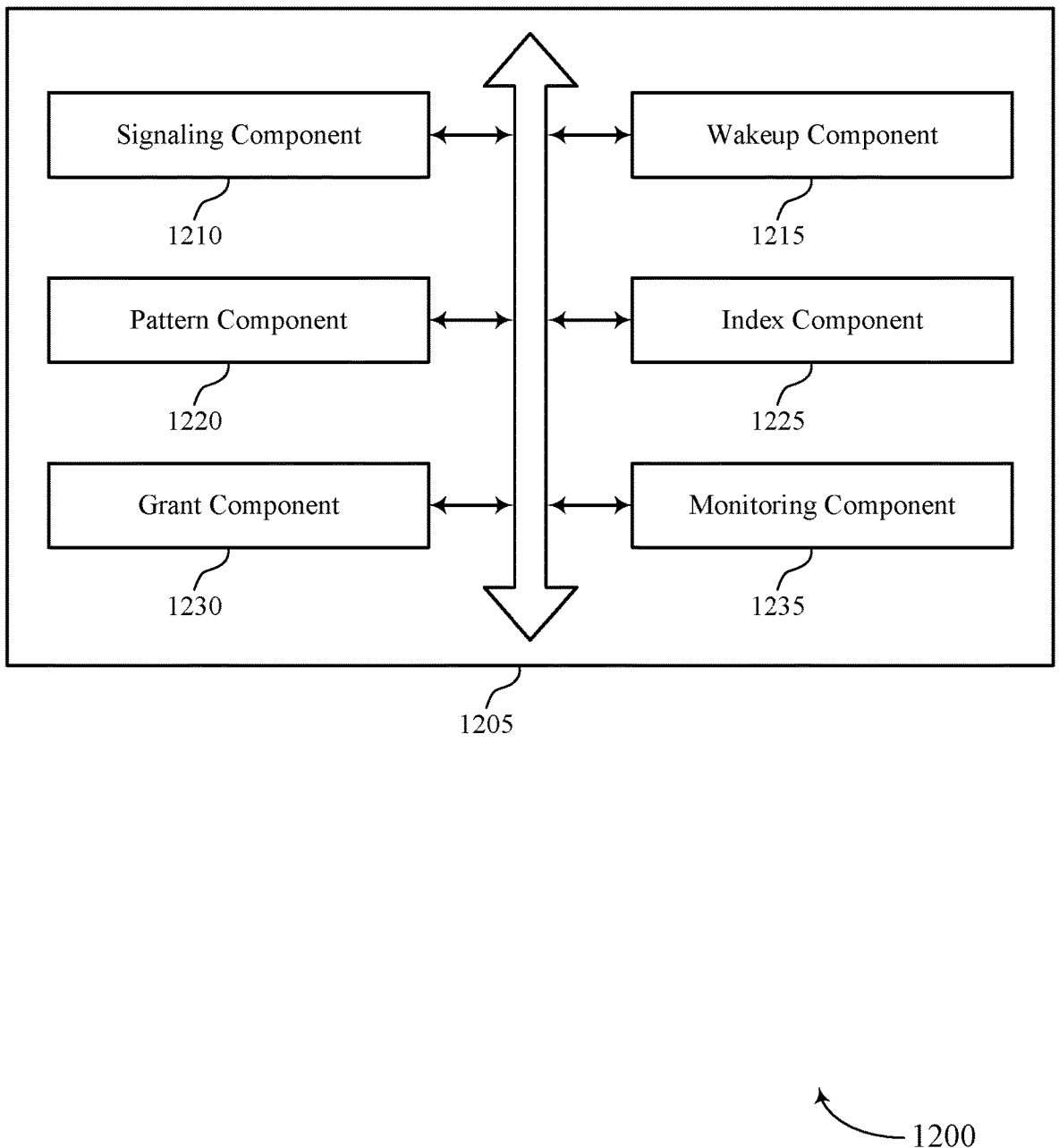
FIG. 12 shows a block diagram of a communications manager that supports wakeup grouping for DRX operation in accordance with aspects of the present disclosure.

FIG. 12 shows a block diagram 1200 of a communications manager 1205 that supports wakeup grouping for DRX operation in accordance with aspects of the present disclosure. The communications manager 1205 may be an example of aspects of a communications manager 1015, a communications manager 1115, or a communications manager 1310 described herein. The communications manager 1205 may include a signaling component 1210, a wakeup component 1215, a pattern component 1220, an index component 1225, a grant component 1230, and a monitoring component 1235. Each of these modules may communicate, directly or indirectly, with one another (e.g., via one or more buses).

The signaling component 1210 may transmit, to a UE, signaling configuring the UE with a set of wakeup grouping sets, each of the set of wakeup grouping sets identifying a set of groups of one or more UEs. In some examples, the signaling component 1210 may transmit RRC signaling indicating the set of wakeup grouping sets. In some examples, each wakeup grouping set of the set of wakeup grouping sets, the UE is a member of at least one group of the at least one group of one or more UEs. In some cases, each group of the set of groups is associated with a different resource than each other group of the set of groups. In some cases, the resource includes a frequency resource, or a time resource, or a control channel signaling type, or a reference signal type, or a data payload, or a radio network temporary identifier, or a combination thereof.

The wakeup component 1215 may determine, for a monitoring occasion, a wakeup grouping set of the set of wakeup grouping sets, the determined wakeup grouping set including a group that includes the UE. In some examples, the wakeup component 1215 may transmit, during the monitoring occasion, a wakeup signal for the group according to the determined wakeup grouping set. In some examples, the wakeup component 1215 may identify a second group of the wakeup grouping set for one or more additional UEs. In some cases, the wakeup component 1215 may transmit, during the monitoring occasion, the wakeup signal for the group that includes the UE using a first set of resources and for the second group for the one or more additional UEs on a second set of resources. In some cases, the transmitted wakeup signal includes one or more reference signals, or control channel signaling, or one or more predetermined sequences, or a combination thereof. In some cases, the one or more reference signals include a channel state information reference signal, or a tracking reference signal, or a demodulation reference signal, or a synchronization signal, or a combination thereof. In some cases, the one or more predetermined sequences include a pseudo-noise code sequence, or a Gold sequence, or a Zadoff-Chu sequence, or a combination thereof.

The pattern component 1220 may identify a hopping pattern for the set of wakeup grouping sets. In some examples, the pattern component 1220 may determine the wakeup grouping set for the monitoring occasion according to the identified hopping pattern. The index component 1225 may identify an index associated with the monitoring occasion, the index including a system frame number, or a DRX cycle index, or a frequency resource index, or a carrier index, or a combination thereof. In some examples, the index component 1225 may determine the wakeup grouping set for the monitoring occasion according to the identified hopping pattern and the index associated with the monitoring occasion.

The grant component 1230 may transmit, to the UE, a grant within a control channel subsequent to the monitoring occasion. In some examples, the grant component 1230 may communicate with the UE based on the grant. In some examples, the grant component 1230 may resources of the control channel are different than resources of the monitoring occasion for wakeup signals. The monitoring component 1235 may include in the monitoring occasion includes a pre-wakeup window of a C-DRX cycle.

Figure 13:
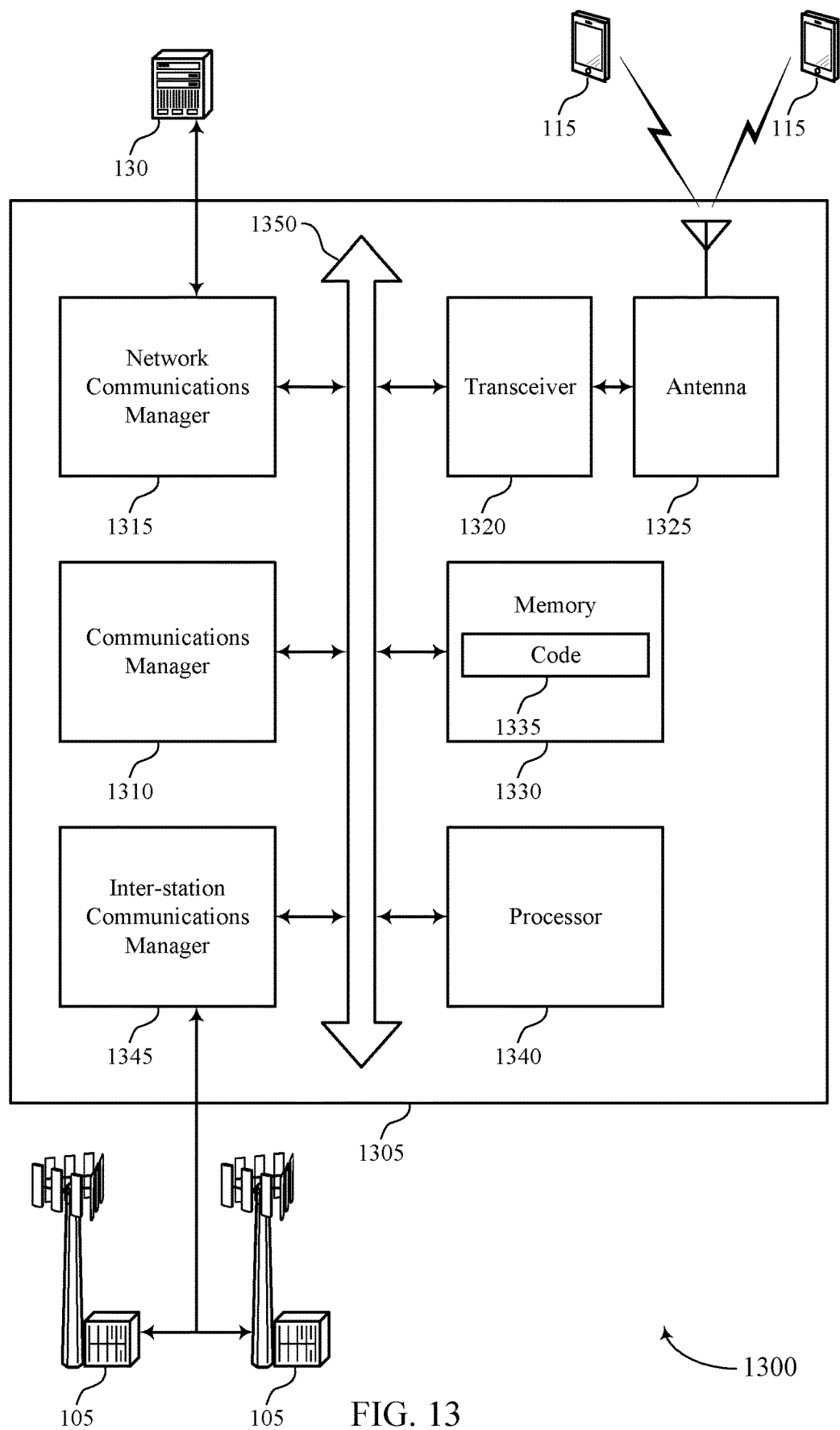
FIG. 13 shows a diagram of a system including a device that supports wakeup grouping for DRX operation in accordance with aspects of the present disclosure.

FIG. 13 shows a diagram of a system 1300 including a device 1305 that supports wakeup grouping for DRX operation in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, signaling configuring the UE with a set of wakeup grouping sets, each of the set of wakeup grouping sets identifying a set of groups of one or more UEs, determine, for a monitoring occasion, a wakeup grouping set of the set of wakeup grouping sets, the determined wakeup grouping set including a group that includes the UE, and transmit, during the monitoring occasion, a wakeup signal for the group according to the determined wakeup grouping set.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the device 1305 may include a single antenna 1325. However, in some examples, the device 1305 may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting wakeup grouping for DRX operation).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
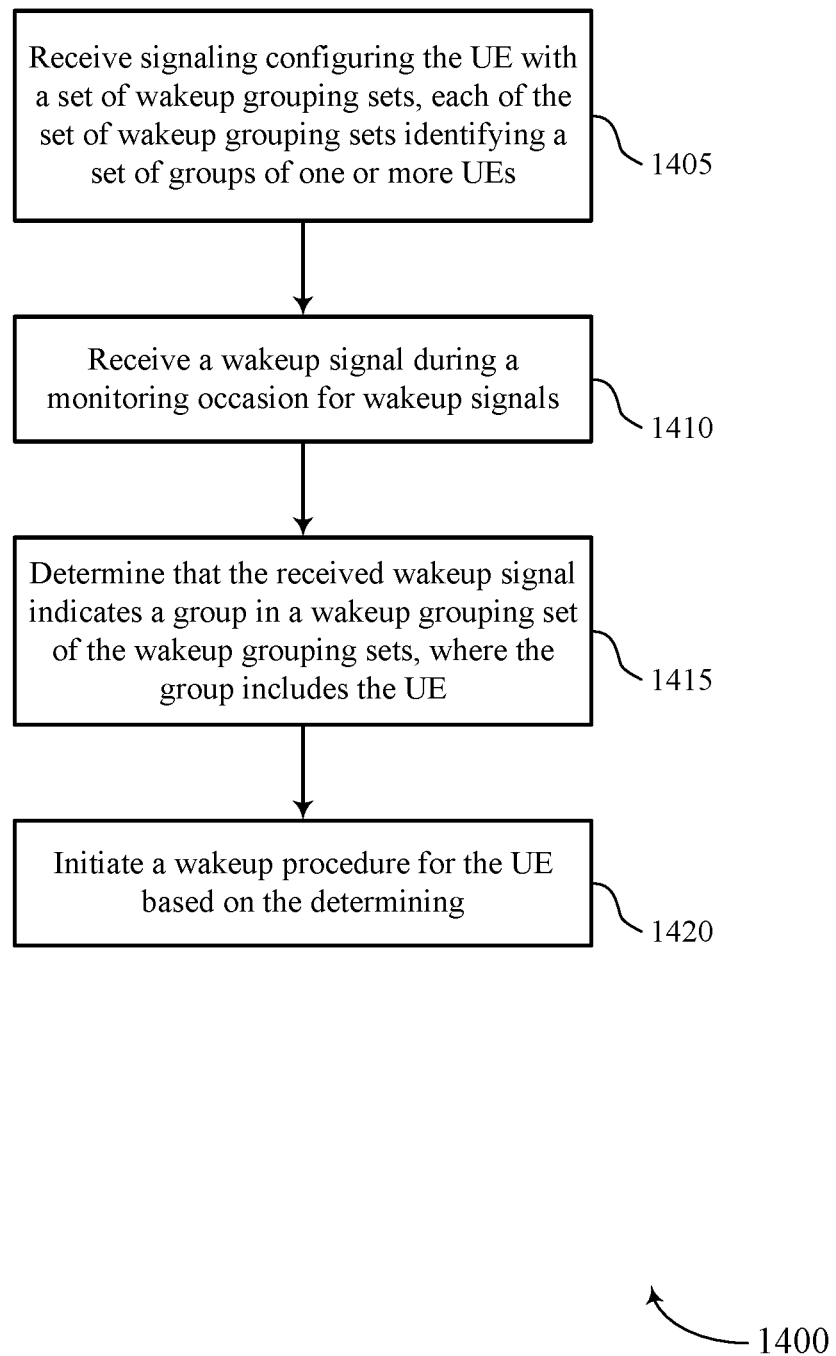
FIGS. 14 through 18 show flowcharts illustrating methods that support wakeup grouping for DRX operation in accordance with aspects of the present disclosure.

FIG. 14 shows a flowchart illustrating a method 1400 that supports wakeup grouping for DRX operation in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive signaling configuring the UE with a set of wakeup grouping sets, each of the set of wakeup grouping sets identifying a set of groups of one or more UEs. The operations of 1405 may be performed according to the methods described herein. In some examples, aspects of the operations of 1405 may be performed by a signaling component as described with reference to FIGS. 6 through 9.

At 1410, the UE may receive a wakeup signal during a monitoring occasion for wakeup signals. The operations of 1410 may be performed according to the methods described herein. In some examples, aspects of the operations of 1410 may be performed by a wakeup component as described with reference to FIGS. 6 through 9.

At 1415, the UE may determine that the received wakeup signal indicates a group in a wakeup grouping set of the wakeup grouping sets, where the group includes the UE. The operations of 1415 may be performed according to the methods described herein. In some examples, aspects of the operations of 1415 may be performed by a wakeup component as described with reference to FIGS. 6 through 9.

At 1420, the UE may initiate a wakeup procedure for the UE based on the determining. The operations of 1420 may be performed according to the methods described herein. In some examples, aspects of the operations of 1420 may be performed by a wakeup component as described with reference to FIGS. 6 through 9.

Figure 15:
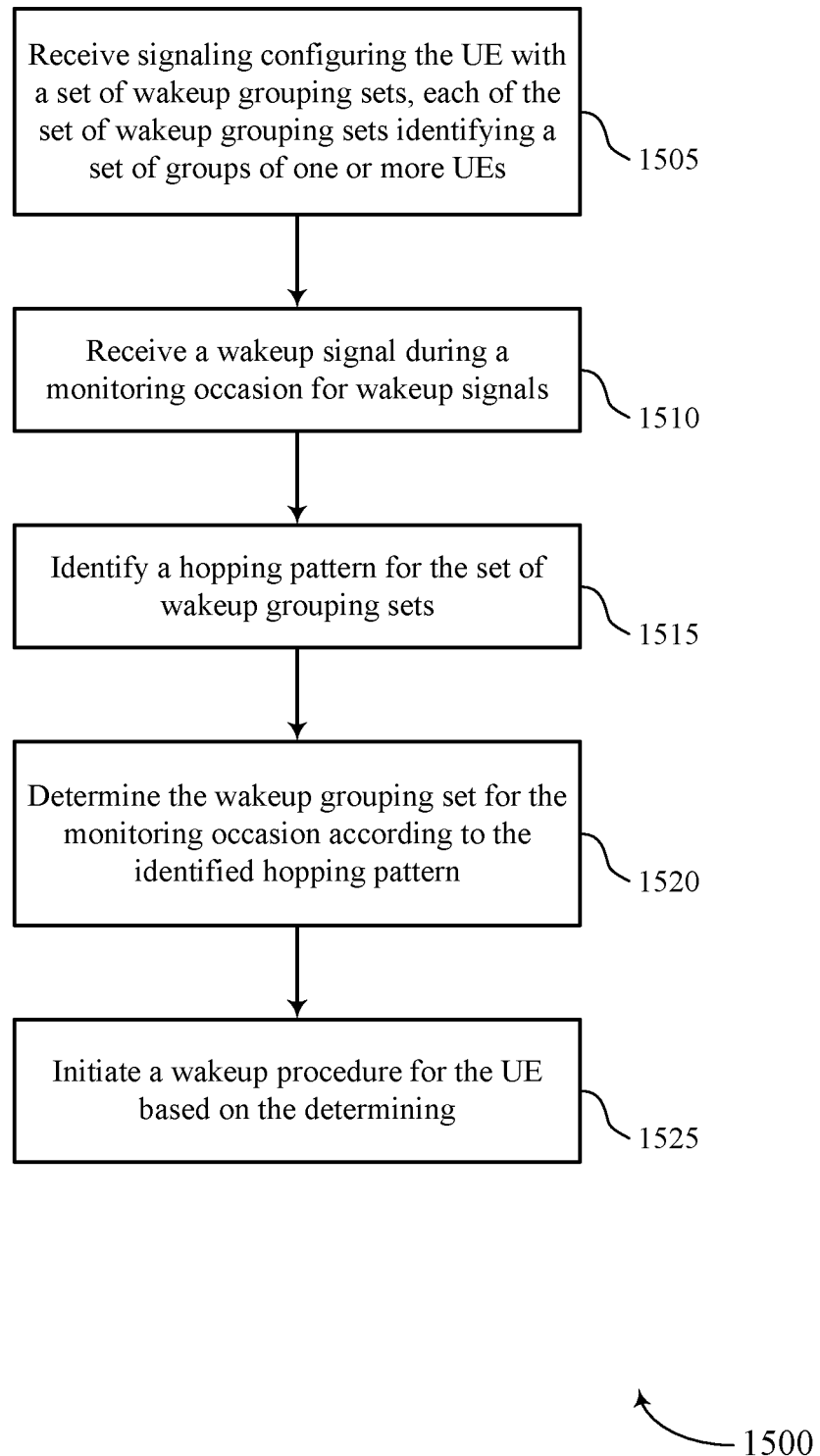

FIG. 15 shows a flowchart illustrating a method 1500 that supports wakeup grouping for DRX operation in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive signaling configuring the UE with a set of wakeup grouping sets, each of the set of wakeup grouping sets identifying a set of groups of one or more UEs. The operations of 1505 may be performed according to the methods described herein. In some examples, aspects of the operations of 1505 may be performed by a signaling component as described with reference to FIGS. 6 through 9.

At 1510, the UE may receive a wakeup signal during a monitoring occasion for wakeup signals. The operations of 1510 may be performed according to the methods described herein. In some examples, aspects of the operations of 1510 may be performed by a wakeup component as described with reference to FIGS. 6 through 9.

At 1515, the UE may identify a hopping pattern for the set of wakeup grouping sets. The operations of 1515 may be performed according to the methods described herein. In some examples, aspects of the operations of 1515 may be performed by a pattern component as described with reference to FIGS. 6 through 9.

At 1520, the UE may determine the wakeup grouping set for the monitoring occasion according to the identified hopping pattern. The operations of 1520 may be performed according to the methods described herein. In some examples, aspects of the operations of 1520 may be performed by a pattern component as described with reference to FIGS. 6 through 9.

At 1525, the UE may initiate a wakeup procedure for the UE based on the determining. The operations of 1525 may be performed according to the methods described herein. In some examples, aspects of the operations of 1525 may be performed by a wakeup component as described with reference to FIGS. 6 through 9.

Figure 16:
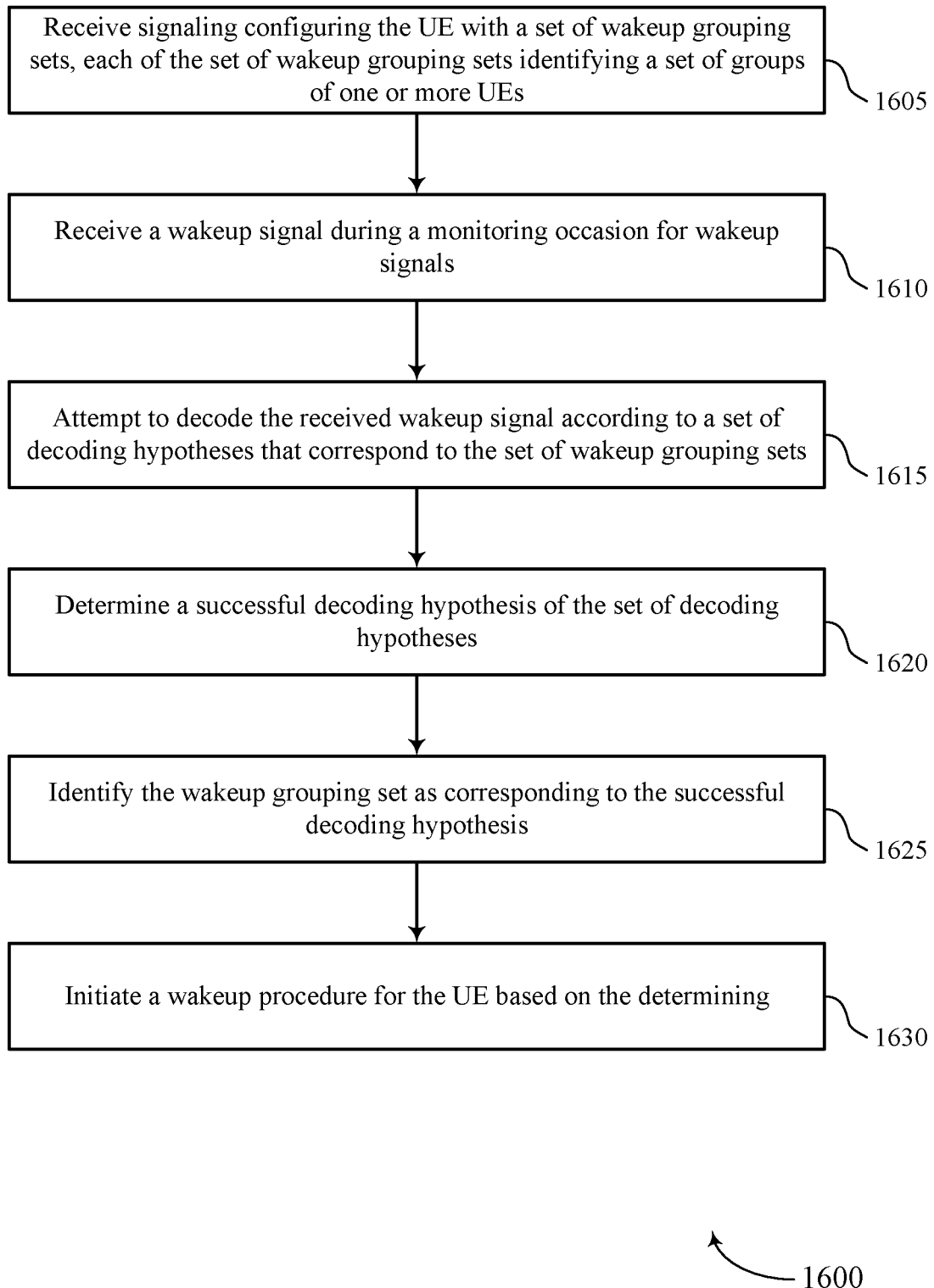

FIG. 16 shows a flowchart illustrating a method 1600 that supports wakeup grouping for DRX operation in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive signaling configuring the UE with a set of wakeup grouping sets, each of the set of wakeup grouping sets identifying a set of groups of one or more UEs. The operations of 1605 may be performed according to the methods described herein. In some examples, aspects of the operations of 1605 may be performed by a signaling component as described with reference to FIGS. 6 through 9.

At 1610, the UE may receive a wakeup signal during a monitoring occasion for wakeup signals. The operations of 1610 may be performed according to the methods described herein. In some examples, aspects of the operations of 1610 may be performed by a wakeup component as described with reference to FIGS. 6 through 9.

At 1615, the UE may attempt to decode the received wakeup signal according to a set of decoding hypotheses that correspond to the set of wakeup grouping sets. The operations of 1615 may be performed according to the methods described herein. In some examples, aspects of the operations of 1615 may be performed by a decoding component as described with reference to FIGS. 6 through 9.

At 1620, the UE may determine a successful decoding hypothesis of the set of decoding hypotheses. The operations of 1620 may be performed according to the methods described herein. In some examples, aspects of the operations of 1620 may be performed by a decoding component as described with reference to FIGS. 6 through 9.

At 1625, the UE may identify the wakeup grouping set as corresponding to the successful decoding hypothesis. The operations of 1625 may be performed according to the methods described herein. In some examples, aspects of the operations of 1625 may be performed by a decoding component as described with reference to FIGS. 6 through 9.

At 1630, the UE may initiate a wakeup procedure for the UE based on the determining. The operations of 1630 may be performed according to the methods described herein. In some examples, aspects of the operations of 1630 may be performed by a wakeup component as described with reference to FIGS. 6 through 9.

Figure 17:
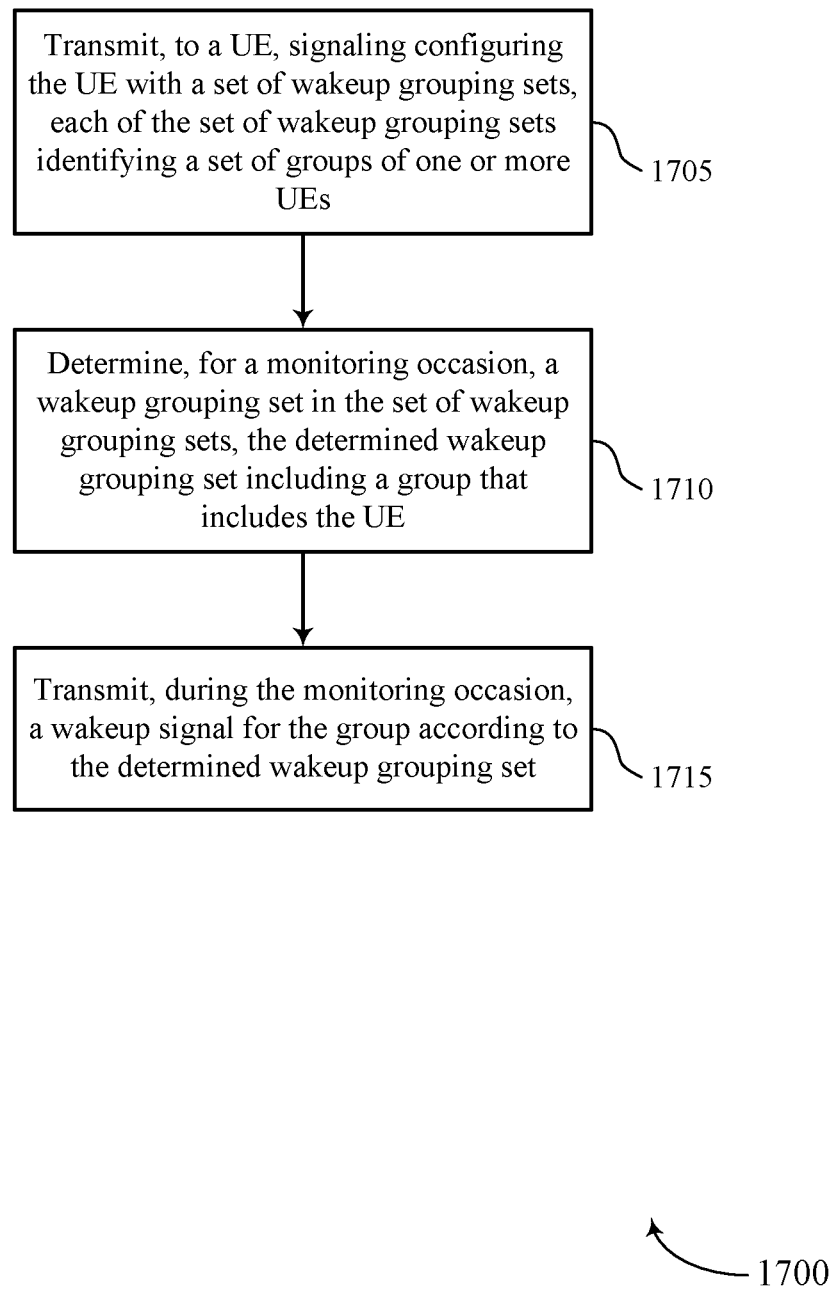

FIG. 17 shows a flowchart illustrating a method 1700 that supports wakeup grouping for DRX operation in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, signaling configuring the UE with a set of wakeup grouping sets, each of the set of wakeup grouping sets identifying a set of groups of one or more UEs. The operations of 1705 may be performed according to the methods described herein. In some examples, aspects of the operations of 1705 may be performed by a signaling component as described with reference to FIGS. 10 through 13.

At 1710, the base station may determine, for a monitoring occasion, a wakeup grouping set of the set of wakeup grouping sets, the determined wakeup grouping set including a group that includes the UE. The operations of 1710 may be performed according to the methods described herein. In some examples, aspects of the operations of 1710 may be performed by a wakeup component as described with reference to FIGS. 10 through 13.

At 1715, the base station may transmit, during the monitoring occasion, a wakeup signal for the group according to the determined wakeup grouping set. The operations of 1715 may be performed according to the methods described herein. In some examples, aspects of the operations of 1715 may be performed by a wakeup component as described with reference to FIGS. 10 through 13.

Figure 18:
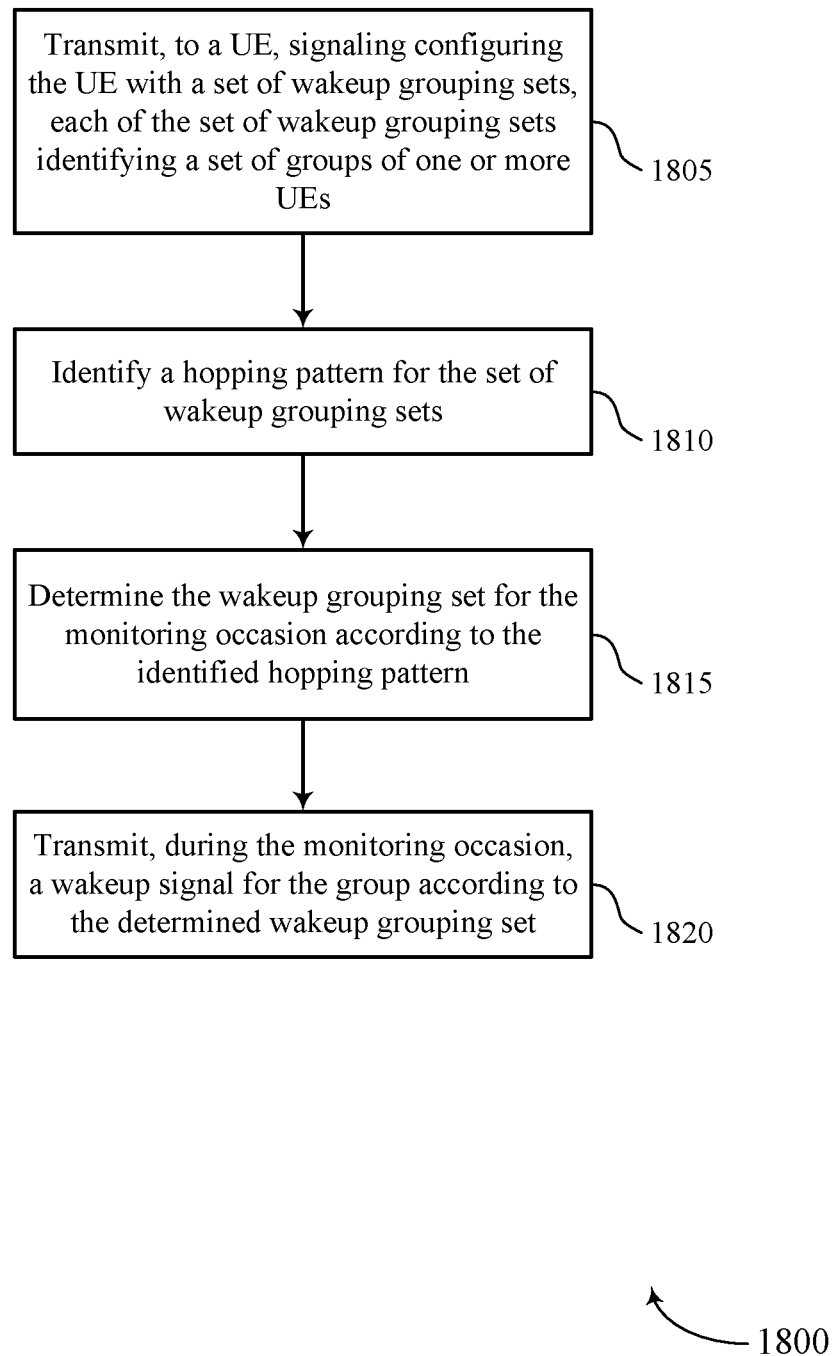

FIG. 18 shows a flowchart illustrating a method 1800 that supports wakeup grouping for DRX operation in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below.

Additionally or alternatively, a base station may perform aspects of the functions described below using special-purpose hardware.

At 1805, the base station may transmit, to a UE, signaling configuring the UE with a set of wakeup grouping sets, each of the set of wakeup grouping sets identifying a set of groups of one or more UEs. The operations of 1805 may be performed according to the methods described herein. In some examples, aspects of the operations of 1805 may be performed by a signaling component as described with reference to FIGS. 10 through 13.

At 1810, the base station may identify a hopping pattern for the set of wakeup grouping sets. The operations of 1810 may be performed according to the methods described herein. In some examples, aspects of the operations of 1810 may be performed by a pattern component as described with reference to FIGS. 10 through 13.

At 1815, the base station may determine the wakeup grouping set for the monitoring occasion according to the identified hopping pattern. The operations of 1815 may be performed according to the methods described herein. In some examples, aspects of the operations of 1815 may be performed by a pattern component as described with reference to FIGS. 10 through 13.

At 1820, the base station may transmit, during the monitoring occasion, a wakeup signal for the group according to the determined wakeup grouping set. The operations of 1820 may be performed according to the methods described herein. In some examples, aspects of the operations of 1820 may be performed by a wakeup component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving signaling configuring the UE with a plurality of wakeup grouping sets and a plurality of monitoring occasions, each monitoring occasion of the plurality of monitoring occasions comprising a plurality of resources, each monitoring occasion corresponding to a respective wakeup grouping set of the plurality of wakeup grouping sets, and each of the plurality of wakeup grouping sets identifying a plurality of groups of one or more UEs, wherein the UE is a member of a first group of the plurality of groups associated with a first wakeup grouping set, and a member of a second group of the plurality of groups associated with a second wakeup grouping set, wherein the first group is different from the second group;
    receiving a wakeup signal during a monitoring occasion of the plurality of monitoring occasions for wakeup signals associated with the first wakeup grouping set;
    determining, based at least in part on the monitoring occasion being for wakeup signals associated with the first wakeup grouping set, that the received wakeup signal indicates the first group in the first wakeup grouping set; and
    initiating a wakeup procedure for the UE based at least in part on the determining.

2. The method of claim 1, further comprising:
    identifying a hopping pattern for the plurality of wakeup grouping sets; and
    determining the first wakeup grouping set for the monitoring occasion according to the identified hopping pattern.

3. The method of claim 2, further comprising:
    identifying an index associated with the monitoring occasion, the index comprising a system frame number, or a discontinuous reception cycle index, or a frequency resource index, or a carrier index, or a combination thereof; and
    determining the first wakeup grouping set for the monitoring occasion according to the identified hopping pattern and the index associated with the monitoring occasion.

4. The method of claim 1, further comprising:
    attempting to decode the received wakeup signal according to a plurality of decoding hypotheses that correspond to the plurality of wakeup grouping sets;
    determining a successful decoding hypothesis of the plurality of decoding hypotheses; and
    identifying the first wakeup grouping set is associated with the monitoring occasion based at least in part on the first wakeup grouping set corresponding to the successful decoding hypothesis.

5. The method of claim 1, wherein receiving the signaling configuring the UE with the plurality of wakeup grouping sets comprises:
receiving radio resource control signaling from a base station indicating the plurality of wakeup grouping sets.

6. The method of claim 1, wherein each group of the plurality of groups is associated with a different resource of the plurality of resources than each other group of the plurality of groups.

7. The method of claim 6, wherein the different resource comprises a frequency resource, or a time resource, or a control channel signaling type, or a reference signal type, or a data payload, or a radio network temporary identifier, or a combination thereof.

8. The method of claim 1, wherein the received wakeup signal comprises one or more reference signals, or control channel signaling, or one or more predetermined sequences, or a combination thereof.

9. The method of claim 8, wherein the one or more reference signals comprise a channel state information reference signal, or a tracking reference signal, or a demodulation reference signal, or a synchronization signal, or a combination thereof.

10. The method of claim 8, wherein the one or more predetermined sequences comprise a pseudo-noise code sequence, or a Gold sequence, or a Zadoff-Chu sequence, or a combination thereof.

11. The method of claim 1, further comprising:
monitoring a control channel subsequent to initiating the wakeup procedure, wherein first resources of the monitored control channel are different than second resources of the monitoring occasion for wakeup signals;
receiving, within the control channel, a grant from a base station serving the UE; and
communicating with the base station based at least in part on the grant.

12. The method of claim 1, wherein the monitoring occasion comprises a pre-wakeup window of a connected mode discontinuous reception cycle.

13. A method for wireless communication at a base station, comprising:
transmitting, to a user equipment (UE), signaling configuring the UE with a plurality of wakeup grouping sets and a plurality of monitoring occasions, each monitoring occasion of the plurality of monitoring occasions comprising a plurality of resources, each monitoring occasion corresponding to a respective wakeup grouping set of the plurality of wakeup grouping sets, and each of the plurality of wakeup grouping sets identifying a plurality of groups of one or more UEs, wherein the UE is a member of a first group of the plurality of groups associated with a first wakeup grouping set, and a member of a second group of the plurality of groups associated with a second wakeup grouping set, wherein the first group is different from the second group;
determining, for a monitoring occasion of the plurality of monitoring occasions and based at least in part on the monitoring occasion being for wakeup signals associated with the first wakeup grouping set, the first wakeup grouping set comprises the first group; and
transmitting, during the monitoring occasion, a wakeup signal for the first group according to the determined first wakeup grouping set.

14. The method of claim 13, further comprising:
identifying a hopping pattern for the plurality of wakeup grouping sets; and
determining the first wakeup grouping set for the monitoring occasion according to the identified hopping pattern.

15. The method of claim 14, further comprising:
identifying an index associated with the monitoring occasion, the index comprising a system frame number, or a discontinuous reception cycle index, or a frequency resource index, or a carrier index, or a combination thereof; and
determining the first wakeup grouping set for the monitoring occasion according to the identified hopping pattern and the index associated with the monitoring occasion.

16. The method of claim 13, wherein transmitting the signaling configuring the UE with the plurality of wakeup grouping sets comprises:
transmitting radio resource control signaling indicating the plurality of wakeup grouping sets.

17. The method of claim 13, further comprising:
identifying a third group of the first wakeup grouping set for one or more additional UEs; and
wherein transmitting the wakeup signal for the first group comprises:
transmitting, during the monitoring occasion, the wakeup signal for the first group using a first set of resources and for the third group for the one or more additional UEs on a second set of resources.

18. The method of claim 13, wherein each group of the plurality of groups is associated with a different resource of the plurality of resources than each other group of the plurality of groups.

19. The method of claim 18, wherein the different resource comprises a frequency resource, or a time resource, or a control channel signaling type, or a reference signal type, or a data payload, or a radio network temporary identifier, or a combination thereof.

20. The method of claim 13, wherein the transmitted wakeup signal comprises one or more reference signals, or control channel signaling, or one or more predetermined sequences, or a combination thereof.

21. The method of claim 20, wherein the one or more reference signals comprise a channel state information reference signal, or a tracking reference signal, or a demodulation reference signal, or a synchronization signal, or a combination thereof.

22. The method of claim 20, wherein the one or more predetermined sequences comprise a pseudo-noise code sequence, or a Gold sequence, or a Zadoff-Chu sequence, or a combination thereof.

23. The method of claim 13, further comprising:
transmitting, to the UE, a grant within a control channel subsequent to the monitoring occasion, wherein first resources of the control channel are different than second resources of the monitoring occasion for wakeup signals; and
communicating with the UE based at least in part on the grant.

24. The method of claim 13, wherein the monitoring occasion comprises a pre-wakeup window of a connected mode discontinuous reception cycle.

25. An apparatus for wireless communication, comprising:
a processor,
memory in electronic communication with the processor; and
instructions stored in the memory and executable by the processor to cause the apparatus to:

receive signaling configuring the apparatus with a plurality of wakeup grouping sets and a plurality of monitoring occasions, each monitoring occasion of the plurality of monitoring occasions comprising a plurality of resources, each monitoring occasion corresponding to a respective wakeup grouping set of the plurality of wakeup grouping sets, and each of the plurality of wakeup grouping sets identifying a plurality of groups of one or more apparatuses, wherein the apparatus is a member of a first group of the plurality of groups associated with a first wakeup grouping set, and a member of a second group of the plurality of groups associated with a second wakeup grouping set, wherein the first group is different from the second group;

receive a wakeup signal during a monitoring occasion of the plurality of monitoring occasions for wakeup signals associated with the first wakeup grouping set;

determine, based at least in part on the monitoring occasion being for wakeup signals associated with the first wakeup grouping set, that the received wakeup signal indicates the first group in the first wakeup grouping set; and initiate a wakeup procedure for the apparatus based at least in part on the determining.

26. The apparatus of claim 25, wherein the instructions are further executable by the processor to cause the apparatus to:

identify a hopping pattern for the plurality of wakeup grouping sets; and determine the first wakeup grouping set for the monitoring occasion according to the identified hopping pattern.

27. The apparatus of claim 26, wherein the instructions are further executable by the processor to cause the apparatus to:

identify an index associated with the monitoring occasion, the index comprising a system frame number, or a discontinuous reception cycle index, or a frequency resource index, or a carrier index, or a combination thereof; and determine the first wakeup grouping set for the monitoring occasion according to the identified hopping pattern and the index associated with the monitoring occasion.

28. An apparatus for wireless communication, comprising:

a processor, memory in electronic communication with the processor; and instructions stored in the memory and executable by the processor to cause the apparatus to:

transmit, to a user equipment (UE), signaling configuring the UE with a plurality of wakeup grouping sets and a plurality of monitoring occasions, each monitoring occasion of the plurality of monitoring occasions comprising a plurality of resources, each monitoring occasion corresponding to a respective wakeup grouping set of the plurality of wakeup grouping sets, and each of the plurality of wakeup grouping sets identifying a plurality of groups of one or more UEs, wherein the UE is a member of a first group of the plurality of groups associated with a first wakeup grouping set, and a member of a second group of the plurality of groups associated with a second wakeup grouping set, wherein the first group is different from the second group;

determine, for a monitoring occasion of the plurality of monitoring occasions and based at least in part on the monitoring occasion being for wakeup signals associated with the first wakeup grouping set, the first wakeup grouping set comprises the first group; and transmit, during the monitoring occasion, a wakeup signal for the first group according to the determined first wakeup grouping set.

29. The method of claim 1, wherein each resource of the plurality of resources for the monitoring occasion corresponds to a respective group of the plurality of groups.

* * * * *